US012671045B2

(12) United States Patent
Xu et al.

(10) Patent No.: US 12,671,045 B2
(45) Date of Patent: Jun. 30, 2026

(54) CIRCUIT BREAKER

(71) Applicant: SENSATA TECHNOLOGIES CHANGZHOU CO., LTD., Changzhou (CN)

(72) Inventors: Jigang Xu, Changzhou (CN); Wei Sun, Changzhou (CN); Jim Ji, Changzhou (CN); Felix Zhang, Changzhou (CN)

(73) Assignee: SENSATA TECHNOLOGIES CHANGZHOU CO., LTD., Changzhou (CN)

( * ) Notice: Subject to any disclaimer, the term of this patent is extended or adjusted under 35 U.S.C. 154(b) by 229 days.

(21) Appl. No.: 18/471,614

(22) Filed: Sep. 21, 2023

(65) Prior Publication Data

US 2024/0304402 A1 Sep. 12, 2024

(30) Foreign Application Priority Data

Mar. 10, 2023 (CN) ......................... 202310231403.6

(51) Int. Cl.
*H01H 39/00* (2006.01)
*H01H 9/30* (2006.01)

(52) U.S. Cl.
CPC ............ *H01H 39/006* (2013.01); *H01H 9/30* (2013.01)

(58) Field of Classification Search
CPC ...... H01H 9/30; H01H 39/006; H01H 39/002; H01H 39/004; H01H 2039/008;
(Continued)

(56) References Cited

U.S. PATENT DOCUMENTS 5,783,987 A * 7/1998 Kern ...................... H01H 39/00 337/403
7,123,124 B2 * 10/2006 Caruso ................. H01H 39/006 200/61.08
(Continued)

FOREIGN PATENT DOCUMENTS

CN 112017882 A * 12/2020 ............... H01H 1/58
EP 4040466 A1 8/2022
(Continued)

OTHER PUBLICATIONS

Translation of CN112017882A (Original document published Dec. 1, 2020). (Year: 2020).*
(Continued)

*Primary Examiner* — William A Bolton
(74) *Attorney, Agent, or Firm* — Mark H. Williams

(57) ABSTRACT

The present application discloses a circuit breaker comprising: a housing defining an operating chamber and an arc extinguishing chamber; a severing mechanism provided in the operating chamber and comprising a punch, the severing mechanism being configured to sever via the punch a conductor extending through the housing between the operating chamber and the arc extinguishing chamber; an arc extinguishing medium in the form of a wire mesh and filled within the arc extinguishing chamber; and a gas flow guiding mechanism disposed around the arc extinguishing medium and configured to guide the gas from the punch of the severing mechanism through the arc extinguishing medium when the conductor extending through the housing is severed by the severing mechanism.

20 Claims, 25 Drawing Sheets

(58) Field of Classification Search
CPC ........ H01H 71/12; H01H 73/18; H01H 37/76; H01H 37/761; H01H 2037/762; H01H 2037/768; H01H 2037/769; H01H 85/00
USPC ............. 218/155, 12, 14, 48, 95, 85, 90, 93; 200/244, 61.08; 337/157, 401
See application file for complete search history.

(56) References Cited

U.S. PATENT DOCUMENTS

| | | | | |
|---|---|---|---|---|
| 9,773,628 | B2 * | 9/2017 | Fukuyama | H01H 39/006 |
| 10,714,276 | B2 * | 7/2020 | Moszynski | H01H 33/88 |
| 11,342,145 | B2 * | 5/2022 | Fernandez | H01H 9/042 |
| 11,387,633 | B2 * | 7/2022 | Mannekutla | H02B 13/00 |
| 2016/0155589 | A1 | 6/2016 | Mangeant | |
| 2019/0244778 | A1 * | 8/2019 | Dariavach | H01H 39/006 |
| 2021/0257172 | A1 | 8/2021 | Sakai et al. | |
| 2021/0350991 | A1 * | 11/2021 | Fukuda | H01H 39/006 |
| 2022/0285114 | A1 | 9/2022 | Nakamura et al. | |
| 2022/0384130 | A1 | 12/2022 | Haba et al. | |
| 2023/0154713 | A1 * | 5/2023 | Ge | H01H 85/38 337/187 |
| 2023/0260727 | A1 * | 8/2023 | Dugast | H01H 9/02 337/186 |
| 2023/0395344 | A1 * | 12/2023 | Marlin | H01H 39/006 |

FOREIGN PATENT DOCUMENTS

| | | | |
|---|---|---|---|
| WO | 2007134875 | A1 | 11/2007 |
| WO | 2021007604 | A1 | 1/2021 |
| WO | 2022123159 | A1 | 6/2022 |
| WO | 2022130781 | A1 | 6/2022 |

OTHER PUBLICATIONS

Extended European Search Report, EP23199407.0, Feb. 26, 2024, 21 pages.

* cited by examiner

CIRCUIT BREAKER

FIELD OF THE INVENTION

The present application generally relates to a circuit breaker.

DESCRIPTION OF RELATED ART

Circuit overcurrent protection products are fuses that fuse based on the heat generated by the current flowing through the fuse, and the main problem thereof is the relationship between the thermal fuse and the load matching. For example, in the case of electric vehicle main circuit protection, if the load has a low multiplier overload or short circuit, the choice of a low current specification fuse cannot meet the current overshoot in short time, and the choice of a high current specification fuse cannot meet the requirements of fast protection. In electric vehicles, the lithium battery pack is used to provide energy. In the case of a short circuit the output current is about several times the rated current, and thus the fuse protection time cannot meet the requirements, resulting in the battery pack heat up and possible fire combustion. Due to the withstand current heat and break current heat, melting is originated from the current flowing through the fuse. Protection devices using current heat fusing cannot achieve a break speed of a certain amplitude under the condition of having a higher rated current or withstanding a stronger short-time overload/inrush current (such as a short-time high current during the starting or climbing of an electric vehicle). Protection devices also cannot withstand a higher rated current or a larger overload/ inrush current without damage under the condition of a fast enough protection speed of a certain amplitude fault current.

At present, there is a rapid severing structure, which mainly includes an electronic ignition device, a conductive plate and a receiving cavity. An electronic ignition device is used to generate high-pressure gas to drive an actuator to break the conductive plate. After the fracture of the conductive plate, it falls to the receiving cavity, to achieve the purpose of rapid disconnection of the circuit. However, there are still some shortcomings and defects, resulting in limited arc extinguishing capacity, so that it is difficult to interrupt large fault current.

SUMMARY OF THE INVENTION

In at least one particular embodiment, a circuit break is described that includes a strong arc extinguishing capability. In at least one other embodiment, a circuit breaker is described that includes good breaking performance and an ability to obtain excellent insulation impedance after breaking.

In a particular embodiment of the present application, a circuit breaker is described that includes a housing defining an operating chamber and an arc extinguishing chamber. The circuit breaker also includes a severing mechanism provided in the operating chamber and comprising a punch. In this embodiment, the severing mechanism is configured to sever via the punch a conductor extending through the housing between the operating chamber and the arc extinguishing chamber. The punch of the severing mechanism includes a first punch and a second punch spaced apart from each other to define a groove therebetween. The conductor is broken at a single severing point when the conductor extending through the housing is severed by the severing mechanism. A baffle plate is provided within the arc extinguishing chamber and aligned with the groove. The baffle plate is configured to be inserted into the groove after the conductor is broken at the severing point. The circuit breaker further includes an arc extinguishing medium in the form of a wire mesh and filled within the arc extinguishing chamber. In this embodiment, the circuit breaker also includes a gas flow guiding mechanism disposed around the arc extinguishing medium and configured to guide the gas (high temperature gas generated by the burning arc) from the punch of the severing mechanism through the arc extinguishing medium when the conductor extending through the housing is severed by the severing mechanism.

The arc extinguishing medium in the form of wire mesh can effectively dissipate the arc generated when the conductor is severed, while the gas flow guiding mechanism allows the gas containing the arc to fully contact with the arc extinguishing medium more efficiently and enhance the arc extinguishing effect of the circuit breaker.

According to some embodiments of the circuit breaker of the present application, a gas flow guiding path is defined from the punch of the severing mechanism to the gas flow guiding mechanism, and the arc extinguishing medium is located in the gas flow guiding path.

According to some embodiments of the circuit breaker of the present application, the gas flow guiding mechanism comprises a plurality of cavities surrounding the arc extinguishing medium, wherein the gas flows from the punch of the severing mechanism through the arc extinguishing medium and into the plurality of cavities when the conductor extending through the housing is severed by the severing mechanism.

According to some embodiments of the circuit breaker of the present application, the cavity has an inlet facing the arc extinguishing medium, wherein the gas flows from the punch of the severing mechanism through the arc extinguishing medium and into the cavity via the inlet when the conductor extending through the housing is severed by the severing mechanism. Further, in some embodiments, each of the plurality of cavities has an inlet facing the arc extinguishing medium.

According to some embodiments of the circuit breaker of the present application, the inlet is in the form of an elongated gap.

According to some embodiments of the circuit breaker of the present application, the plurality of cavities are uniformly distributed around the arc extinguishing medium.

According to some embodiments of the circuit breaker of the present application, the first punch is acted on a first severing section of the conductor to bend the first severing section downward and the second punch is acted on a second severing section of the conductor to bend the second severing section downward, so that the conductor is broken at the single severing point between the first severing section and the second severing section.

According to some embodiments of the circuit breaker of the present application, the groove is aligned with the severing point.

According to some embodiments of the circuit breaker of the present application, the first punch and the second punch are extended into the arc extinguishing chamber and contacted with the arc extinguishing medium in the arc extinguishing chamber respectively, after the conductor is broken at the severing point.

According to some embodiments of the circuit breaker of the present application, the baffle plate is spaced at a distance from the severing point so as to facilitate the conductor being severed at the severing point.

According to some embodiments of the circuit breaker of the present application, a creepage path is defined from a severing end of the first severing section, through an end of the first punch, through a bottom of the groove and a top of the baffle plate, through an end of the second punch, to a severing end of the second severing section.

The groove in combination with the baffle plate defines a tortuous creepage path, further reducing the possibility of conduction between the first severing section and the second severing section. The combination of the groove and the baffle plate increases the creepage distance from the first severing section to the second severing section, significantly improving the insulation resistance.

According to some embodiments of the circuit breaker of the present application, the arc extinguishing chamber is divided by the baffle plate into a first arc extinguishing chamber and a second arc extinguishing chamber isolated from each other, the first arc extinguishing chamber and the second arc extinguishing chamber being filled with the arc extinguishing medium.

According to some embodiments of the circuit breaker of the present application, the first punch is extended into the first arc extinguishing chamber and contacted with the arc extinguishing medium in the first arc extinguishing chamber, and the second punch is extended into the second arc extinguishing chamber and contacted with the arc extinguishing medium in the second arc extinguishing chamber, after the conductor is broken at the severing point.

According to some embodiments of the circuit breaker of the present application, the arc extinguishing chamber is covered with a supporting component for supporting the conductor, wherein an opening is formed at a portion of the supporting component corresponding to a first severing section and a second severing section of the conductor, such that the first severing section and the second severing section are bent downward through the opening and the first punch and the second punch are extended through the opening into the arc extinguishing chamber, when the conductor extending through the housing is severed by the severing mechanism.

According to some embodiments of the circuit breaker of the present application, the opening is configured such that the first severing section and the second severing section of the conductor are not supported by the supporting component.

According to some embodiments of the circuit breaker of the present application, a first receiving portion and a second receiving portion are formed at the opening of the supporting component, wherein the first receiving portion and the second receiving portion are configured to receive the first severing section bent downward and the second severing section bent downward respectively after the conductor is broken at the severing point.

In a particular embodiment of the present disclosure, a circuit breaker includes a housing defining an operating chamber and an arc extinguishing chamber. The circuit breaker also includes a severing mechanism provided in the operating chamber and comprising a punch. The severing mechanism is configured to sever via the punch a conductor extending through the housing between the operating chamber and the arc extinguishing chamber. In this embodiment, the conductor is broken at a single severing point when the conductor extending through the housing is severed by the punch of the severing mechanism. A receiving member is provided within the arc extinguishing chamber and aligned with the punch. The punch is accepted by the receiving member after the conductor is broken at the severing point. In this embodiment, the circuit breaker further includes an arc extinguishing medium in the form of a wire mesh and filled within the arc extinguishing chamber. The circuit breaker also includes a gas flow guiding mechanism disposed around the arc extinguishing medium and configured to guide the gas from the punch of the severing mechanism through the arc extinguishing medium when the conductor extending through the housing is severed by the severing mechanism.

According to some embodiments of the circuit breaker of the present application, a gas flow guiding path is defined from the punch of the severing mechanism to the gas flow guiding mechanism, and the arc extinguishing medium is located in the gas flow guiding path.

According to some embodiments of the circuit breaker of the present application, the gas flow guiding mechanism comprises a plurality of cavities surrounding the arc extinguishing medium, wherein the gas flows from the punch of the severing mechanism through the arc extinguishing medium and into the plurality of cavities when the conductor extending through the housing is severed by the severing mechanism.

According to some embodiments of the circuit breaker of the present application, the cavity has an inlet facing the arc extinguishing medium, wherein the gas flows from the punch of the severing mechanism through the arc extinguishing medium and into the cavity via the inlet when the conductor extending through the housing is severed by the severing mechanism.

According to some embodiments of the circuit breaker of the present application, when the conductor extending through the housing is severed by the severing mechanism, the punch is acted on a severing section of the conductor to bend the severing section downward, so that the conductor is broken at a single severing point.

According to some embodiments of the circuit breaker of the present application, the receiving member is aligned with the severing point or the severing section of the conductor.

According to some embodiments of the circuit breaker of the present application, the punch is extended into the arc extinguishing chamber and contacted with the arc extinguishing medium in the arc extinguishing chamber, after the conductor is broken at the severing point.

According to some embodiments of the circuit breaker of the present application, the receiving member is spaced a distance from the severing point or the severing section of the conductor so as to facilitate the conductor being broken at the severing point.

According to some embodiments of the circuit breaker of the present application, the arc extinguishing chamber is divided by the receiving member into a first arc extinguishing chamber and a second arc extinguishing chamber, the first arc extinguishing chamber and the second arc extinguishing chamber being filled with the arc extinguishing medium.

According to some embodiments of the circuit breaker of the present application, the arc extinguishing chamber is covered with a supporting component for supporting the conductor, wherein an opening is formed at a portion of the supporting component corresponding to the severing point and the severing section of the conductor, such that the severing section is bent downward through the opening and the punch is extended through the opening into the arc extinguishing chamber, when the conductor extending through the housing is severed by the severing mechanism.

According to some embodiments of the circuit breaker of the present application, the opening is configured such that the severing section and the severing point of the conductor are not supported by the supporting component.

According to some embodiments of the circuit breaker of the present application, a receiving portion is formed at the opening of the supporting component, wherein the receiving portion is configured to receive the severing section bent downward after the conductor is broken at the severing point.

BRIEF DESCRIPTION OF THE DRAWINGS

These and other aspects and benefits of the present invention will be better understood after a reading of the followed detailed description together with the attached drawings wherein.

Figure 1:
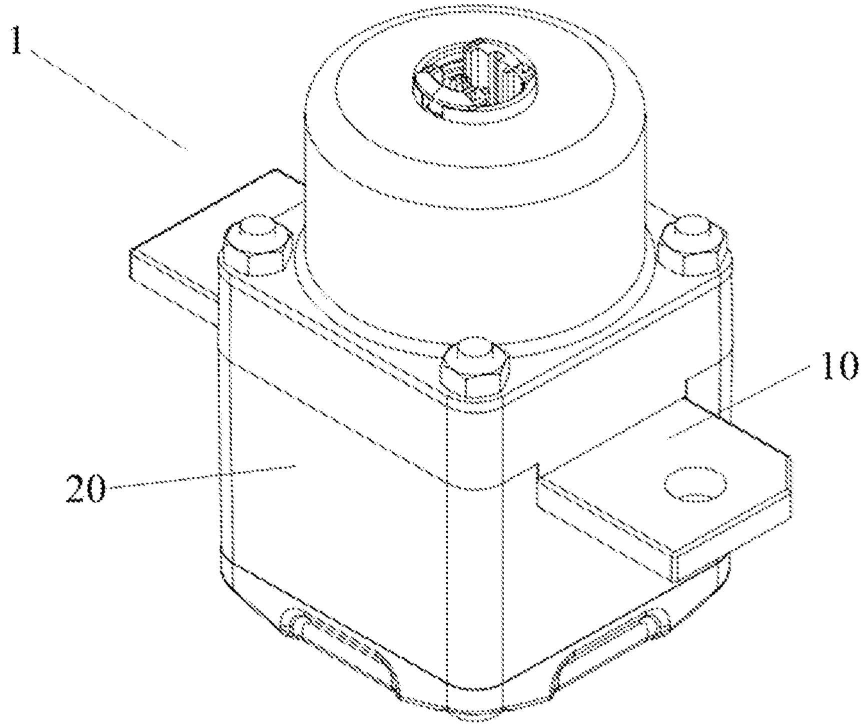
FIG. 1 is a perspective view of a circuit breaker according to one or more embodiments of the present application.

List of reference signs:

| | | | |
|---|---|---|---|
| 1: | Circuit Breaker | | |
| 10: | Conductor | 120: | First severing section |
| 130: | Severing point | 140: | Second severing section |
| 110: | Severing section | | |
| 20: | Housing | 220: | First housing |
| 240: | Second housing | 222: | Operating chamber |
| 242: | Arc extinguishing chamber | 260: | Outer housing |
| 280: | Cap | 242a: | First arc extinguishing chamber |
| 242b: | Second arc extinguishing chamber | 230: | Bolt |
| 30: | Severing mechanism | 320: | Punch |
| 340: | Actuator | 322: | First punch |
| 324: | Second punch | 360: | Groove |
| 40: | Arc extinguishing medium | 420: | Baffle plate |
| 440: | Receiving member | | |
| 50: | Gas flow guiding mechanism | 520: | Cavity |
| 540: | Inlet | 560: | Communication port |
| 60: | Supporting component | 620: | Opening |
| 640: | First receiving portion | 642: | Second receiving portion |
| 644: | Receiving portion. | | |

DETAILED DESCRIPTION

The present disclosure will be described as follows with reference to the accompanying drawings, in which certain embodiments of the present disclosure are shown. However, it is to be understood that the present disclosure may be embodied in many different forms and should not be construed as limited to the embodiments that are pictured and described herein. Rather, these embodiments are provided so that this disclosure will be thorough and complete, and will fully convey the scope of the invention to those skilled in the art. It will also be appreciated that the embodiments disclosed herein can be combined in any way to provide many additional embodiments.

It should be understood that like numbers refer to like elements throughout. In the figures, the size of certain features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. Well-known functions or constructions may not be described in detail for brevity and/or clarity.

As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, but do not preclude the presence or addition of one or more other features. As used herein, the term “and/or” includes any and all combinations of one or more of the associated listed items. As used herein, phrases such as “between X and Y” and “between about X and Y” should be interpreted to include X and Y. As used herein, phrases such as “between about X and Y” mean “between about X and about Y.” As used herein, phrases such as “from about X to Y” mean “from about X to about Y.”

It will be understood that when an element is referred to as being “on”, “attached” to, “connected” to, “coupled” with, “contacting”, etc., another element, it can be directly on, attached to, connected to, coupled with or contacting the other element or intervening elements may also be present. In contrast, when an element is referred to as being, for example, “directly on”, “directly attached” to, “directly connected” to, “directly coupled” with or “directly contacting” another element, there are no intervening elements present. It will also be appreciated by those of skill in the art that references to a structure or feature that is disposed “adjacent” another feature may have portions that overlap or underlie the adjacent feature.

Spatially relative terms, such as “under”, “below”, “lower”, “over”, “upper”, “lateral”, “left”, “right” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as “under” or “beneath” other elements or features would then be oriented “over” the other elements or features. The device may be otherwise oriented (rotated 90 degrees or at other orientations) and the descriptors of relative spatial relationships used herein interpreted accordingly.

Usually, the role of the circuit breaker is to quickly disconnect the main circuit in the event of an abnormal condition such as an overload or short circuit, in order to protect the other circuit components of the main circuit. The conductor on the main circuit is extended through the circuit breaker and the circuit breaker’s severing mechanism is able to sever the conductor to disconnect the main circuit.

When the conductor is severed by the severing mechanism of the circuit breaker, an arc may be generated at the severing section of the conductor. Such an arc is detrimental to the operation of the circuit breaker and may cause the circuit breaker to fail to successfully disconnect the main circuit. Therefore, an arc extinguishing mechanism is usually provided in the circuit breaker to ensure the circuit breaker’s severing operation by performing an arc extinguishing operation on the severing section of the conductor when the conductor is severed by the circuit breaker’s severing mechanism. It is often desired in this field to enhance the arc extinguishing effect of circuit breakers as much as possible to improve the reliability of the circuit breakers.

The circuit breaker according to the present application provides a very significant, even surprised, arc extinguishing effect through an innovative arc extinguishing construction.

A circuit breaker according to some embodiments of the present application will be described in detail below with reference to the accompanying drawings.

Figure 2:
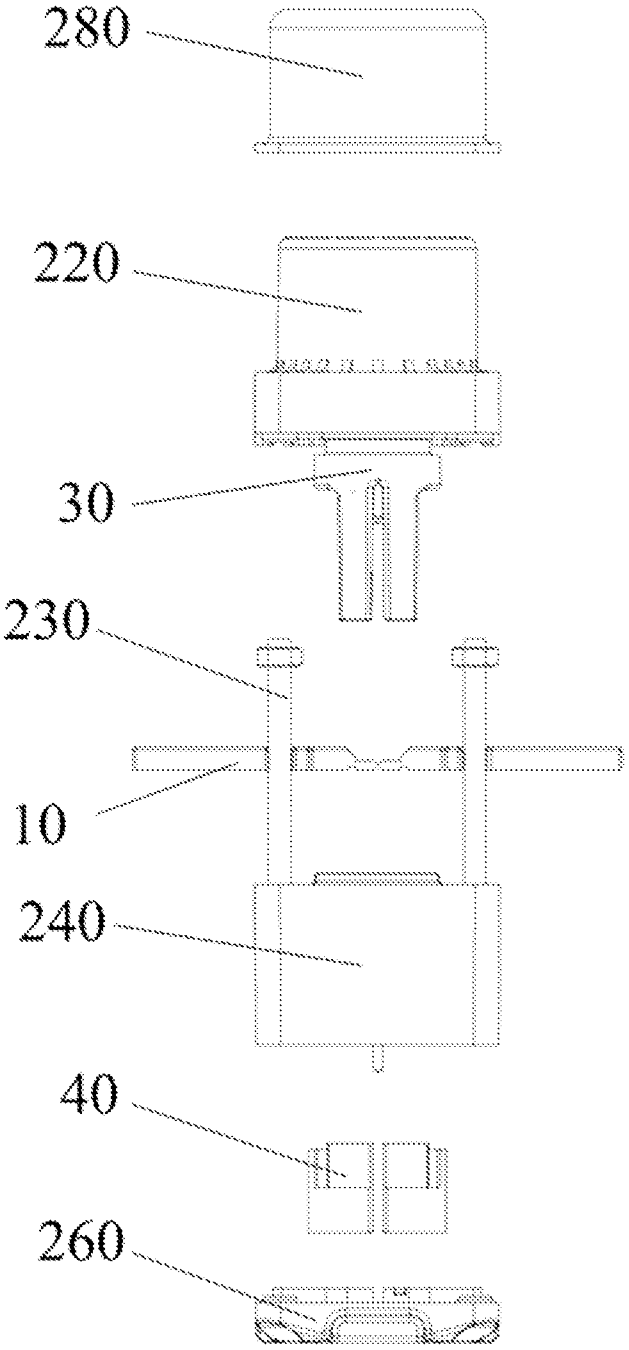
FIG. 2 is an exploded view of a circuit breaker according to one or more embodiments of the present application.

FIG. 1 is a perspective view of a circuit breaker 1 according to some embodiments of the present application, and FIG. 2 is an exploded view of a circuit breaker 1 according to some embodiments of the present application. As shown in FIGS. 1-2, circuit breaker 1 according to some embodiments of the present application includes a conductor 10 and a housing 20. The conductor 10 is connected in a main circuit to be protected (not shown) and is extended through the housing 20. The circuit breaker 1 is configured to sever the conductor 10 to disconnect the main circuit when an abnormal condition occurs in the main circuit, such as an overload or a short circuit.

For ease and clarity of description, a longitudinal direction and a transverse direction of the circuit breakers 1 orthogonal to each other are defined. The longitudinal direction is, for example, the up and down direction of the page in which FIG. 2 is located, and the transverse direction being, for example, the left and right direction of the page in which FIG. 2 is located. For example, the conductor 10 may be described as extending in a transverse direction.

The housing 20 may define an operating chamber and an arc extinguishing chamber. The conductor 10 may extend in a transverse direction between the operating chamber and the arc extinguishing chamber. In some embodiments, as shown, the housing 20 may include a first housing 220 and a second housing 240. The first housing 220 may define the operating chamber 222 and the second housing 240 may define the arc extinguishing chamber 242. The first housing 220 and the second housing 240 may be coupled together by, for example, bolts 230, and the conductor 10 may be provided between the first housing 220 and the second housing 240 to extend through the housing 20 in a transverse direction.

It should be understood that the above example of the housing 20 is only exemplary and not limiting, and other suitable housing configurations can be easily anticipated. For example, the housing 20 may be a single closed housing with the conductor 10 extending through the housing 20 in a transverse direction to divide the interior space of the housing 20 into an operating chamber and an arc extinguishing chamber.

In some embodiments, as shown in FIG. 2, the housing 20 may also include an outer housing 260 that is disposed below the second housing 240 in the longitudinal direction such that the second housing 240 is between the first housing 220 and the outer housing 260. The outer housing 260 may be coupled to the second housing 240 by, for example, a snap fit to assist in closing the internal space of the second housing 240 to form the arc extinguishing chamber 242.

In some embodiments, as shown in FIG. 2, the housing 20 may also optionally include a cap 280 which may be configured to cover the first housing 220.

As shown in FIGS. 3-8, the circuit breaker 1 of some embodiments of the present application includes a severing mechanism 30 that is provided within the operating chamber 222 and is configured to perform a severing operation on the conductor 10. The severing mechanism 30 includes a punch 320 that is provided facing the conductor 10 and is capable of sliding in the longitudinal direction within the operating chamber 222. The severing mechanism 30 is configured to sever the conductor 10 extending through the housing 20 between the operating chamber 222 and the arc extinguishing chamber 242 by sliding the punch 320 in the longitudinal direction to act on the conductor 10.

Figure 3:
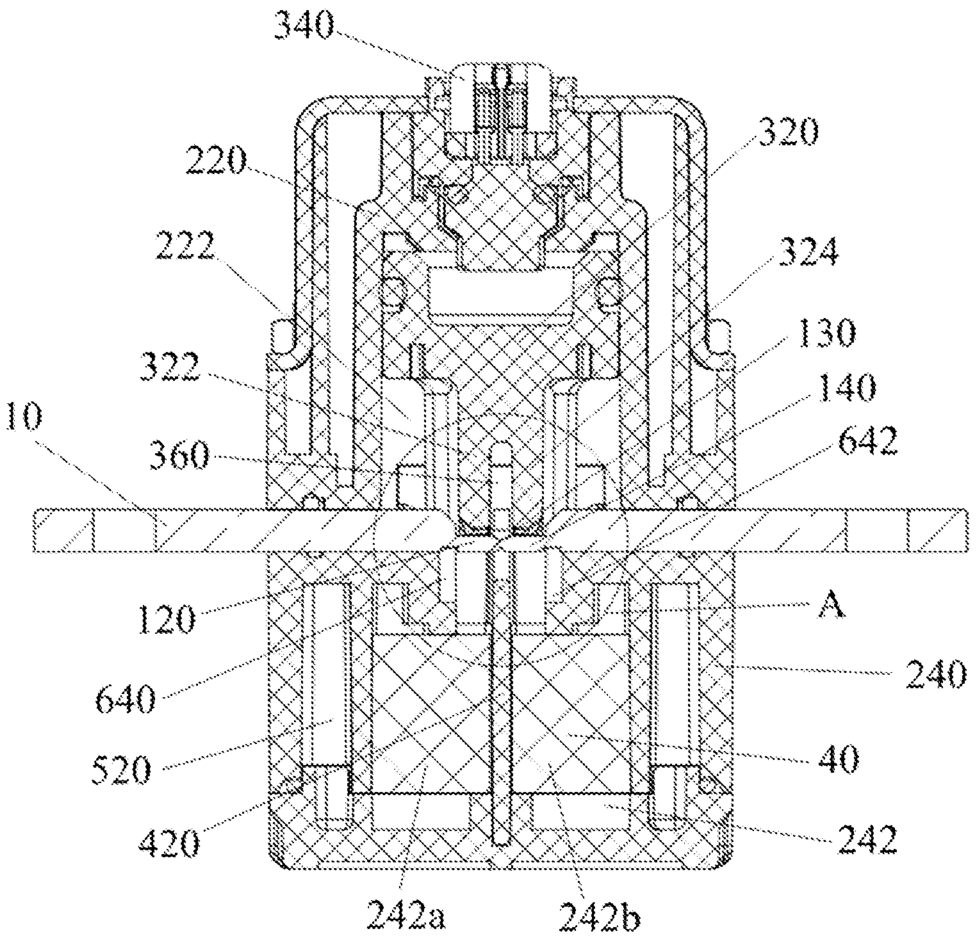
FIG. 3 is a cross-sectional view of a circuit breaker according to one or more embodiments of the present application, showing the circuit breaker in a normal operating state.
Figure 5:
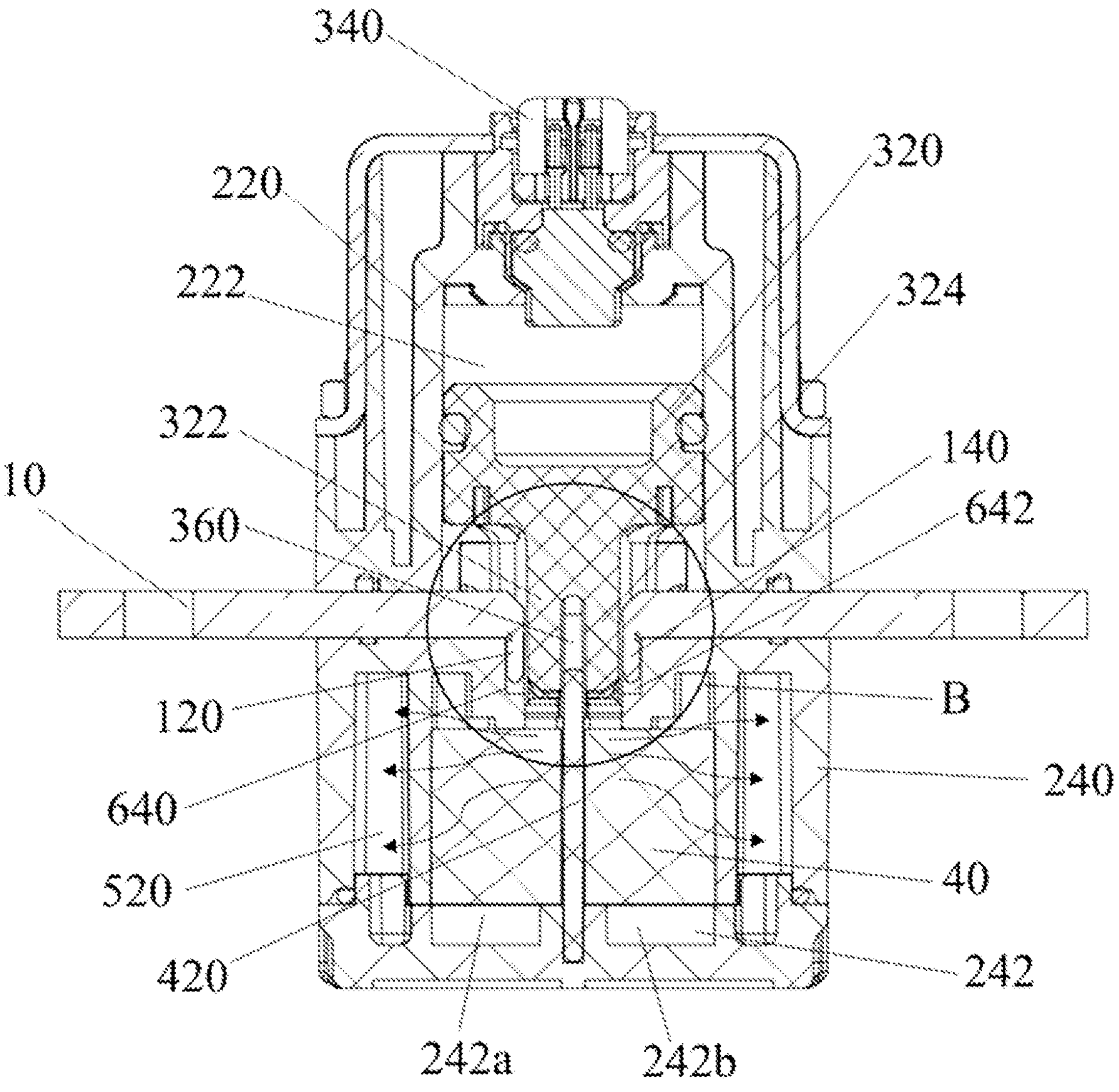
FIG. 5 is a cross-sectional view of a circuit breaker according to one or more embodiments of the present application, showing the circuit breaker in a severing operating state.
Figure 7:
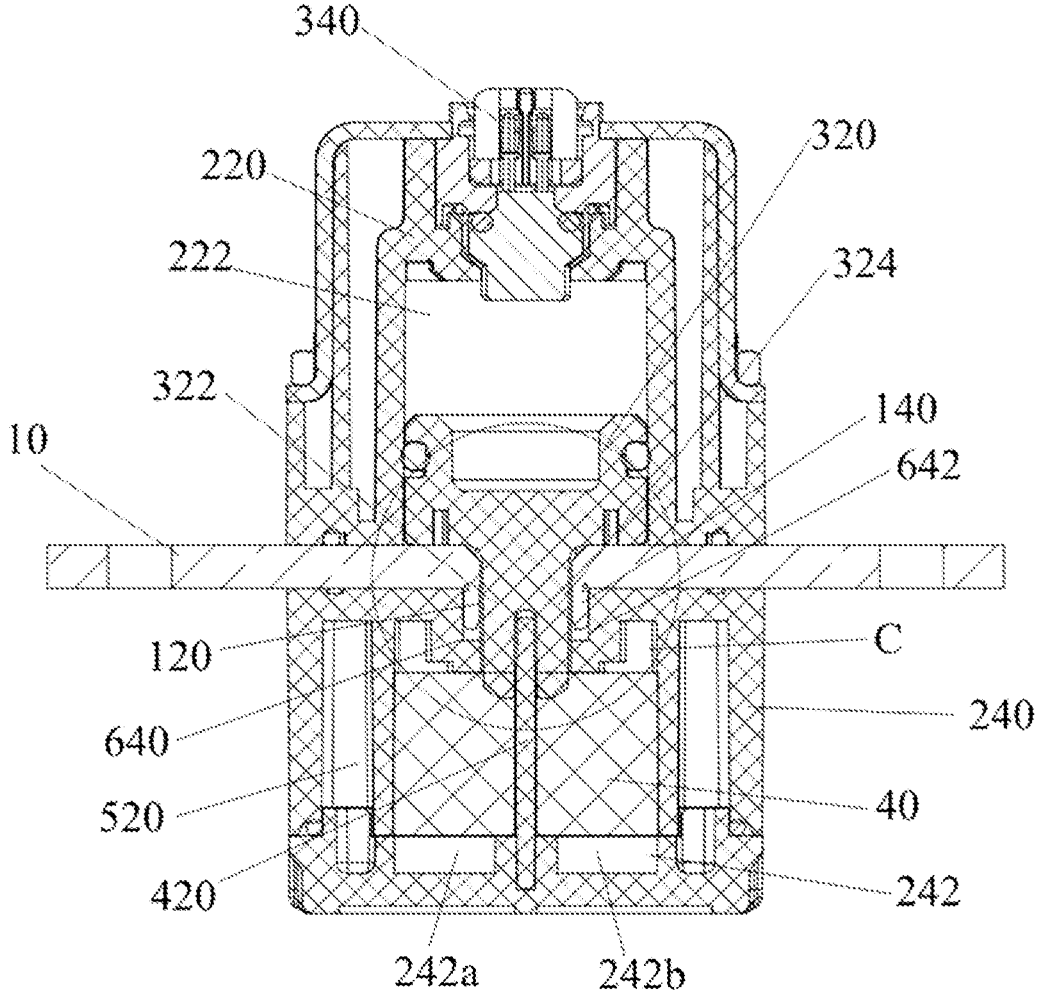
FIG. 7 is a cross-sectional view of a circuit breaker according to one or more embodiments of the present application, showing the circuit breaker in the severing completion state.

In some embodiments, as shown in FIGS. 3, 5, and 7, the severing mechanism 30 may include an actuator 340 that may be activated upon receiving an actuation signal to move (e.g., push) the punch 320 toward the conductor 10 when an abnormal condition, such as an overload or short circuit, occurs in the main circuit, so that the punch 320 is capable of acting on the conductor 10 to sever the conductor 10. The actuator 340 may be in the form of a detonator, for example, which is detonated upon receipt of an actuation signal. The gas generated by the explosion propels the punch 320 toward the conductor 10. It should be understood that the actuator 340 may also employ any other suitable actuator in the art and is not limited to a detonator.

According to some embodiments of the present application, as shown in FIGS. 2-8, the punch 320 of the severing mechanism 30 may include a first punch 322 and a second punch 324 which are spaced apart from each other to define a groove 360 between the first punch 322 and the second punch 324. In the illustrated embodiment, both the first punch 322 and the second punch 324 are columns or rods extending in the longitudinal direction, with the groove 360 defined therebetween also extending in the longitudinal direction and the open end of the groove 360 facing the conductor 10.

A first severing section 120 and a second severing section 140 may be formed on the conductor 10. A severing point 130 is formed between the first severing section 120 and the second severing section 140, i.e., the first severing section 120 and the second severing section 140 are connected to each other by the severing point 130. The first severing section 120 is aligned with the first punch 322 in the longitudinal direction, the second severing section 140 is aligned with the second punch 324 in the longitudinal direction, and the severing point 130 between the first severing section 120 and the second severing section 140 is aligned with the groove 360 between the first punch 322 and the second punch 324 in the longitudinal direction.

The thickness of the severing point 130 can be smaller than the thickness of the first severing section 120 and the second severing section 140, allowing the conductor 10 to be broken at the severing point 130 when the first severing section 120 and the second severing section 140 are stressed. The thickness of the first severing section 120 and the second severing section 140 may be smaller than the thickness of the rest of the conductor 10 to allow for deformation of the first severing section 120 and the second severing section 140 when stressed.

Thus, when an abnormal condition occurs in the main circuit, such as an overload or a break, the first punch 322 and the second punch 324 are actuated by the actuator 340 to move in the longitudinal direction toward the conductor 10 so that the first punch 322 abuts and acts on the first severing section 120 and the second punch 324 abuts and acts on the second severing section 140. As the first punch 322 and the second punch 324 continue to move in the longitudinal direction, the conductor 10 is broken at the severing point 130 between the first severing section 120 and the second severing section 140, with the first severing section 120 bending downward around the end of the first severing section 120 opposite the severing point 130 and the second severing section 140 bending downward around the end of the second severing section 140 opposite the severing point 130, as shown in FIGS. 5-8. The circuit breaker 1 according to the present application adopts a single point severing mode, which can reduce the size of the circuit breaker 1 in the transverse direction, with a compact structure and without space waste.

The width of the first punch 322 in the transverse direction may be substantially equal to or slightly less than the length of the first severing section 120 in the transverse direction, and the width of the second punch 324 in the transverse direction may be substantially equal to or slightly less than the length of the second severing section 140 in the transverse direction, such that the first severing section 120 and the second severing section 140 can be bent downwardly from extending in the transverse direction to extending substantially in the longitudinal direction and adjacent to the sides of the first punch 322 and the second punch 324, respectively. This complete bending of the first severing section 120 and the second severing section 140 also facilitates the reduction of the size of the circuit breaker 1 in the transverse direction.

When the conductor 10 is severed, an electric arc may be generated between the severing end of the first severing section 120 (the end at the severing point 130 before the severing) and the severing end of the second severing section 140 (the end at the severing point 130 before the severing). As described above, this arc is detrimental to the operation of the circuit breaker and may cause the circuit breaker to fail to successfully disconnect the main circuit.

According to some embodiments of the present application, as shown in FIGS. 2-10, the arc extinguishing chamber 242 of the circuit breaker 1 may be filled with an arc extinguishing medium 40, which may be in the form of a wire mesh to advantageously dissipate the arc generated when the conductor 10 is severed. When the conductor 10 is severed, the electric arc generated between the severing end of the first severing section 120 and the severing end of the second severing section 140 may be at least partially dissipated by the wire mesh. The arc extinguishing chamber 242 is formed as a substantially enclosed space, such as through the conductor 10, the second housing 240, and optionally the outer housing 260, to facilitate dissipation of the arc through the arc extinguishing medium 40 within the arc extinguishing chamber 242. In some embodiments, after the conductor 10 is broken at the severing point 130, the first punch 322 and the second punch 324 may be extended into the arc extinguishing chamber 242 by continuing movement in the longitudinal direction, as shown in FIGS. 5 and 7. Optionally, the arc extinguishing medium 40 may be filled within the arc extinguishing chamber 242 such that the first punch 322 and the second punch 324 can eventually be contacted with the arc extinguishing medium 40.

Figure 8:
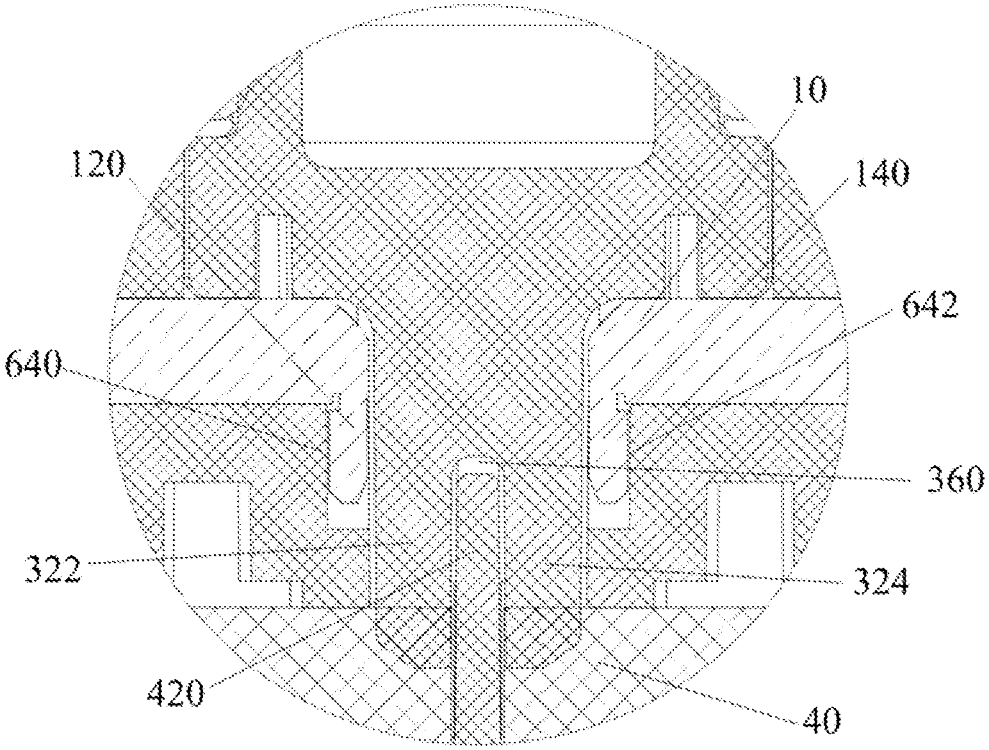
FIG. 8 is an enlarged view of part C of FIG. 7.
Figure 9:
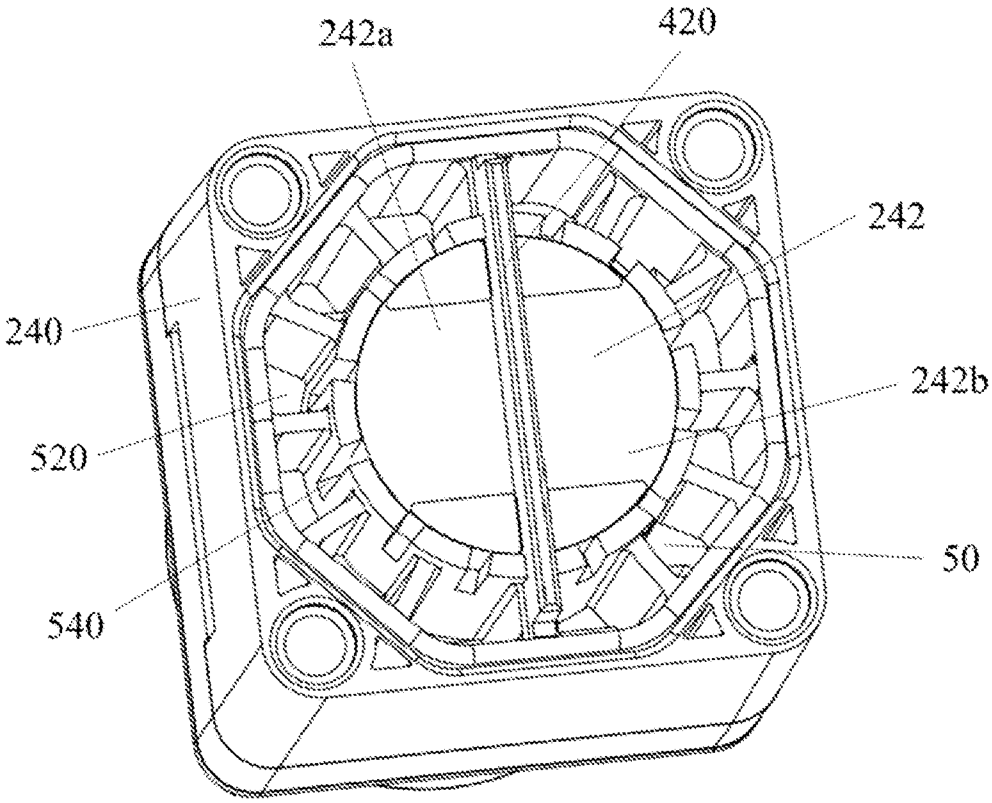
FIG. 9 is a perspective view of a circuit breaker according to one or more embodiments of the present application, showing the arc extinguishing chamber and the arc extinguishing medium and gas flow guiding mechanism therein.
Figure 10:
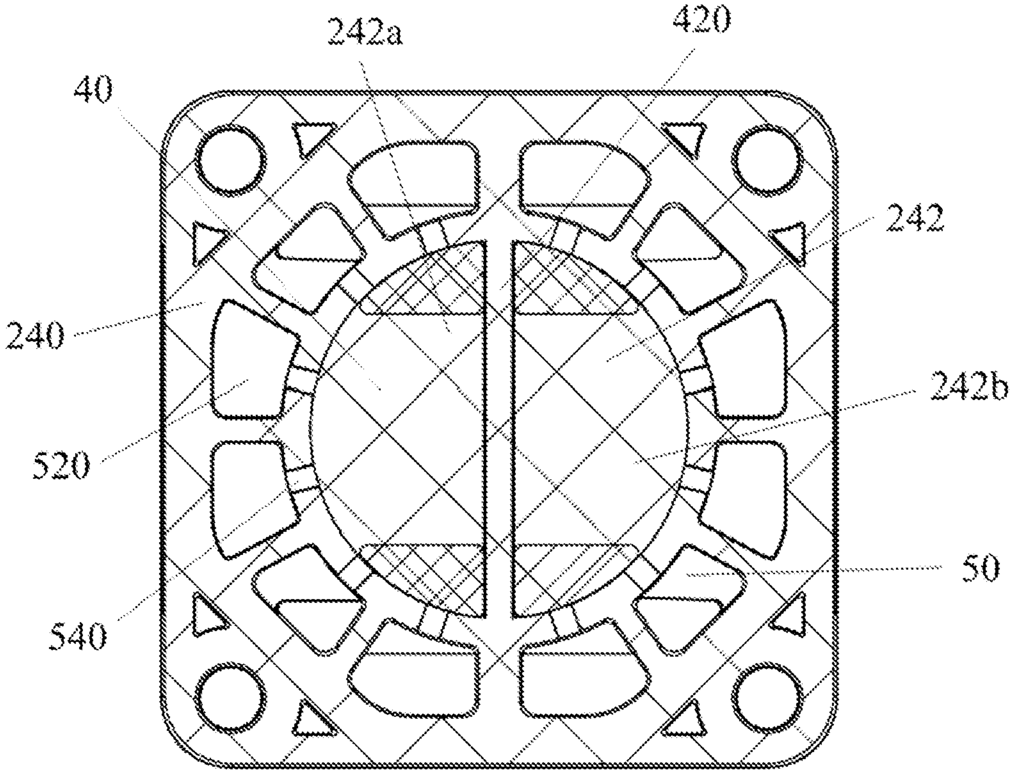
FIG. 10 is a top cross-sectional view of a circuit breaker according to one or more embodiments of the present application, showing the arc extinguishing chamber and the arc extinguishing medium and gas flow guiding mechanism therein.

According to some embodiments of the present application, as shown in FIGS. 3-10, a baffle plate 420 may be provided within the arc extinguishing chamber 242 of the circuit breaker 1. The baffle plate 420 may be in the form of a sheet made of insulating material. The baffle plate 420 extends in a longitudinal direction to divide the arc extinguishing chamber 242 into a first arc extinguishing chamber **242*a* and a second arc extinguishing chamber 242*b*. In some embodiments, the first arc extinguishing chamber 242*a* and the second arc extinguishing chamber 242*b* may be isolated from each other by the baffle plate 420. Both the first arc extinguishing chamber 242*a* and the second arc extinguishing chamber 242*b* are filled with an arc extinguishing medium 40 in the form of a wire mesh, as shown in FIGS. 9-10. In some embodiments, after the conductor 10 is broken at the severing point 130, the first punch 322 may be extended into the first arc extinguishing chamber 242*a* by continuing movement in the longitudinal direction, and the second punch 324 may be extended into the second arc extinguishing chamber 242*b* by continuing movement in the longitudinal direction, as shown in FIGS. 5-8. Optionally, the arc extinguishing medium 40 may be filled within the first arc extinguishing chamber 242*a* and the second arc extinguishing chamber 242*b* such that the first punch 322 is eventually contacted with the arc extinguishing medium 40 within the first arc extinguishing chamber 242***a* and the second punch 324 is eventually contacted with the arc extinguishing medium 40 within the second arc extinguishing chamber 242*b*.

According to some embodiments of the present application, as shown in FIGS. 3-8, the baffle plate 420 can be configured to be aligned with the severing point 130 and the groove 360 along the longitudinal direction such that the baffle plate 420 can be inserted into the groove 360 after the conductor 10 is broken at the severing point 130. The thickness of the baffle plate 420 in the transverse direction may be substantially equal to or slightly less than the width of the groove 360 in the transverse direction to facilitate insertion of the baffle plate 420 into the groove 360 and substantially filling within the groove 360. In some embodiments, the baffle plate 420 is spaced apart in the longitudinal direction from the severing point 130 of the conductor 10, i.e., a distance apart so as to facilitate breaking of the conductor 10 at the severing point 130, i.e., a distance such that the baffle plate 420 does not interfere with or prevent the breaking of the conductor 10 at the severing point 130.

The depth of the groove 360 in the longitudinal direction may be designed in relation to the dimensions of the baffle plate 420 in the longitudinal direction such that the baffle plate 420 can be fully extended into or inserted into the groove 360 when the downward movement of the punch 320 in the longitudinal direction terminates. For example, the top of the baffle plate 420 may abut against or be near the bottom of the groove 360. In the case that the top of the baffle plate 420 is abutted against the bottom of the groove 360, the baffle plate 420 also may be acted as a stop member to stop further downward movement of the punch 320 in the longitudinal direction.

At the severing completion of the circuit breaker 1, i.e., when the punch 320 moves downward in the longitudinal direction until the baffle plate 420 is fully inserted into the groove 360, a creepage path is defined between the severing end of the first severing section 120 of the conductor 10 (the end at the severing point 130 before the severing) and the severing end of the second severing section 140 (the end at the severing point 130 before the severing), which the creepage path is extended from the severing end of the first severing section 120, through the end of the first punch 322, through the bottom of the groove 360 and the top of the baffle 420, and through the end of the second punch 324 to the severing end of the second severing section 140.

The arc extinguishing chamber 242 is divided by the baffle plate 420 into a first arc extinguishing chamber 242*a* and a second arc extinguishing chamber 242*b* that are isolated from each other, so that when the baffle plate 420 is inserted into the groove 360, the first severing section 120 and the second severing section 140 are isolated from each other, elongating the arc length and increasing the arc resistance. The tortuous creepage path formed by the combination of the groove 360 and the baffle plate 420 further reduces the possibility of conduction between the first severing section 120 and the second severing section 140. The cooperation of the groove 360 and the baffle plate 420 increases the creepage distance from the first severing section 120 to the second severing section 140, significantly improving the insulation resistance.

Figure 6:
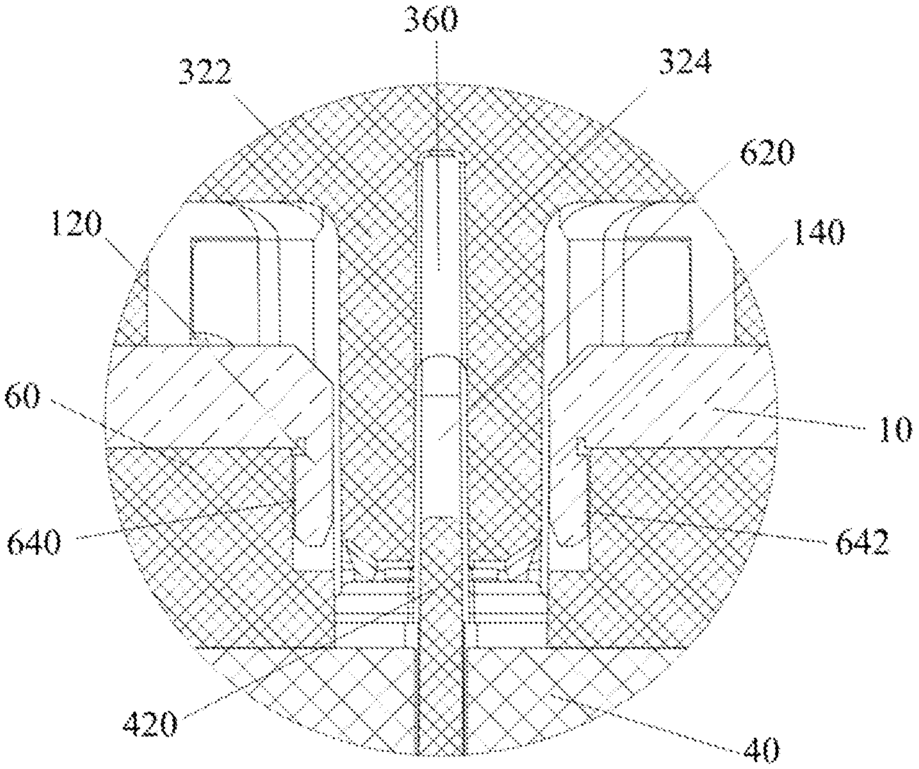
FIG. 6 is an enlarged view of part B of FIG. 5.

After the first punch 322 and the second punch 324 are acted on the first severing section 120 and the second severing section 140 to sever the conductor 10, the baffle plate 420 begins to be inserted into the groove 360, as shown in FIGS. 5-6. At this time, as the first punch 322 and the second punch 324 continue to move in the longitudinal direction, the air pressure at the end and periphery of the first punch 322 and at the end and periphery of the second punch 324 increases, thereby pushing the nearby gas flow in all directions and the flowing gas blows the arc toward the arc extinguishing medium 40, which allows the arc to be dissipated via the arc extinguishing medium 40.

However, after several tests and studies, the inventors found that because the first punch 322 and the second punch 324 are moving along the longitudinal direction, the gas being pushed will mostly move along the longitudinal direction and form turbulence in the arc extinguishing chamber 242, generating a large reverse gas pressure during the arc extinguishing process. Such a movement means the gas does not fully contact with the arc extinguishing medium 40 in the arc extinguishing chamber 242 efficiently in a short period of time.

On this basis, the inventors sought to find means that would allow the gas to efficiently and adequately contact with the arc extinguishing medium 40 within the arc extinguishing chamber 242 in a short period of time. To further improve the arc extinguishing effect of the circuit breaker 1, according to some embodiments of the present application, the circuit breaker 1 may be provided with a gas flow guiding mechanism 50 for guiding the flow of gas within the arc extinguishing chamber 242.

As shown in FIGS. 9-10, according to some embodiments of the present application, a gas flow guiding mechanism 50 may be provided around the arc extinguishing medium 40 within the arc extinguishing chamber 242 and is configured to direct gas from the punch 320, such as the first punch 322 and the second punch 324, through the arc extinguishing medium 40 within the arc extinguishing chamber 242 when the conductor 10 is severed by the severing mechanism 30. Since the gas flow guiding mechanism 50 is provided around the arc extinguishing medium 40, it allows the gas (high temperature gas generated by the burning arc) to fully contact with the arc extinguishing medium 40 within the arc extinguishing chamber 242 when it is guided from the first punch 322 and the second punch 324 to the gas flow guiding mechanism 50.

A gas flow guiding path is defined from the punch 320 of the severing mechanism 30, such as the first punch 322 and the second punch 324, to the gas flow guiding mechanism 50, along which the gas flows to the gas flow guiding mechanism 50 due to increased gas pressure at the end and periphery of the first punch 322 and at the end and periphery of the second punch 324. In the case where the gas flow guiding mechanism 50 is completely disposed around the arc extinguishing medium 40, the arc extinguishing medium 40 are in the gas flow guiding path, thus facilitating the gas to fully contact with the arc extinguishing medium 40 in the arc extinguishing chamber 242 in a short time and in an efficient manner.

According to some embodiments of the present application, as shown in FIGS. 9-10, the gas flow guiding mechanism 50 includes a plurality of cavities 520 provided around the arc extinguishing medium 40. When the conductor 10 is severed by the severing mechanism 30, due to the increased air pressure at the periphery and end of the first punch 322 and the periphery and end of the second punch 324, a pressure difference is created between the periphery and end of the first punch 322 and the periphery and end of the second punch 324 and the cavities 520, so that the gas can be directed from the first punch 322 and the second punch 324 to the plurality of cavities 520 disposed around the arc extinguishing medium 40, in which process the gas will sufficiently be contacted with the arc extinguishing medium 40 to dissipate the arc in the gas.

In the illustrated embodiment, twelve cavities 520 are provided around the arc extinguishing medium 40. It should be understood that this is only exemplary and not limiting, and the number of cavities 520 can be selected according to the specific application. These cavities 520 may be evenly distributed around the arc extinguishing medium 40 to facilitate uniform passage of gas through the arc extinguishing medium 40. These cavities 520 can take the same shape and configuration, or they can be designed to match and fit the space and structure between, for example, the arc extinguishing medium 40 and the inner wall of the second housing 240, depending on the actual configuration of the second housing 240.

According to some embodiments of the present application, each cavity 520 may be provided with an inlet 540 which is arranged to face the arc extinguishing medium 40 such that the gas enters the cavity 520 via the inlet 540 after passing through the arc extinguishing medium 40. In some embodiments, the inlet 540 may be in the form of an elongated gap extending along the longitudinal direction.

According to some embodiments of the present application, as shown in FIGS. 3-8, the circuit breaker 1 may also include a supporting component 60, which is provided between the conductor 10 and the second housing 240, in particular, between the conductor 10 and the arc extinguishing chamber 242. The supporting component 60 can cover the arc extinguishing chamber 242 and is used to support the conductor 10 so as to prevent deformation of any portion of the conductor 10 other than the first severing section 120 and the second severing section 140 when the conductor 10 is severed by the severing mechanism 30.

In order to facilitate the movement of the punch 320 of the severing mechanism 30 and the downward bending of the first severing section 120 and the second severing section 140, an opening 620 could be formed at a portion of the supporting component 60 corresponding to the first severing section 120 and the second severing section 140. The opening 620 may be configured such that the first severing section 120 and the second severing section 140 of the conductor 10 are not supported by the supporting component 60. For example, the opening 620 could be sized to be slightly larger than the sum of the lengths of the first severing section 120 and the second severing section 140 in the transverse direction.

When the conductor 10 is severed by the punch 320 of the severing mechanism 30, the first severing section 120 and the second severing section 140 of the conductor 10 are bent downward through the opening 620, and the first punch 322 and the second punch 324 are extended through the opening 620 and into the arc extinguishing chamber 242, as shown in FIGS. 5-8.

According to some embodiments of the present application, the supporting component 60 may comprise a first receiving portion 640 and a second receiving portion 642 formed at the opening 620, as shown in FIGS. 3-8. For example, a step portion may be formed on opposite sides of the opening 620 in the transverse direction to form the first receiving portion 640 and second receiving portion 642. When the conductor 10 is severed by the severing mechanism 30, the conductor 10 is broken at the severing point 130 and the first severing section 120 and the second severing section 140 are bent downward, so that the first severing section 120 is bent downward to be received in the first receiving portion 640 and the second severing section 140 is bent downward to be received in the second receiving portion 642. After being fully bent, the first severing section 120 is abutted against the side of the first receiving portion 640 and is sandwiched between the side of the first receiving portion 640 and the side of the first punch 322, and the second severing section 140 is abutted against the side of the second receiving portion 642 and is sandwiched between the side of the second receiving portion 642 and the side of the second punch 324, as shown in FIGS. 5-8. The first receiving portion 640 and the second receiving portion 642 help to close the first severing section 120 and the second severing section 140 of the conductor 10 in cooperation with the first punch 322 and the second punch 324.

Figure 4:
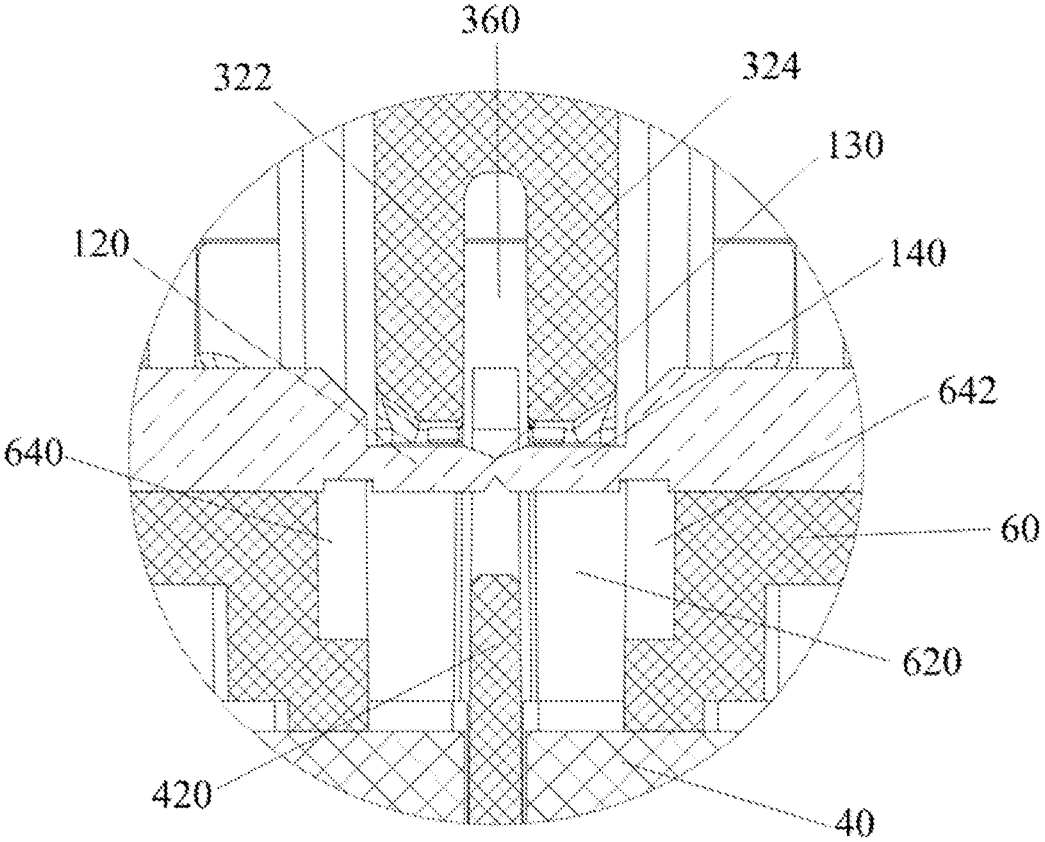
FIG. 4 is an enlarged view of part A of FIG. 3.

The following is a brief description of the operation of the circuit breaker 1 according to some embodiments of the present application with reference to FIGS. 3-8. FIGS. 3-4 illustrate the circuit breaker 1 in a normal operating state, FIGS. 5-6 illustrate the circuit breaker 1 in a severing operating state, and FIGS. 7-8 illustrate the circuit breaker 1 in a severing completion state.

As shown in FIGS. 3-4, in the normal operating condition, there is no abnormal condition such as overload, break or short circuit in the main circuit, the circuit breaker 1 does not perform breaking operation in the main circuit, and the severing mechanism 30 is above the conductor 10 without acting on the conductor 10.

As shown in FIG. 5-6, when there is an abnormal condition such as overload or short circuit in the main circuit, the circuit breaker 1 is switched from the normal operating state to the severing operating state. Specifically, an actuation signal is received by the actuator 340 and then the actuator 340 is activated to move the first punch 322 and the second punch 324 in the longitudinal direction toward the conductor 10 such that the first punch 322 abuts and acts on the first severing section 120 and the second punch 324 abuts and acts on the second severing section 140. As the first punch 322 and the second punch 324 continue to move in the longitudinal direction, the conductor 10 is broken at the severing point 130 between the first severing section 120 and the second severing section 140, with the first severing section 120 bending downward around the end of the first severing section 120 opposite the severing point 130 and the second severing section 140 bending downward around the end of the second severing section 140 opposite the severing point 130. Optionally, the first severing section 120 is bent downward to be received in the first receiving section 640 and the second severing section 140 is bent downward to be received in the second receiving section 642. After being fully bent, the first severing section 120 is abutted against the side of the first receiving portion 640 and is sandwiched between the side of the first receiving portion 640 and the side of the first punch 322, and the second severing section 140 is abutted against the side of the second receiving portion 642 and is sandwiched between the side of the second receiving portion 642 and the side of the second punch 324. At this point, the baffle plate 420 begins to insert into the groove 360. As the first punch 322 and the second punch 324 continue to move in the longitudinal direction, the air pressure at the periphery and end of the first punch 322 and at the periphery and end of the second punch 324 increases, thereby the nearby gas is pushed due to the gas flow guiding mechanism 50 along the gas flow guiding path through the arc extinguishing medium 40 and into the cavity 520 of the gas flow guiding mechanism 50, as shown by the arrows in FIG. 5.

As shown in FIGS. 7-8, as the first punch 322 and the second punch 324 continue to move in the longitudinal direction, the baffle plate 420 is finally fully inserted into the groove 360 and the circuit breaker 1 is switched from the severing operating state to the severing completion state. At this point, the conductor 10 is broken and the arc generated is dissipated, thereby the main circuit is completely disconnected.

Another embodiment according to the present application is described below with reference to FIGS. 11-17. FIGS. 11-16 show sectional views and enlarged views of the circuit breaker 1 according to the present application in the normal operating state, the severing operating state and the severing completion state, respectively. The embodiment of the circuit breaker shown in FIGS. 11-16 is substantially similar to the embodiment of the circuit breaker shown in FIGS. 3-8, and only the differences between the circuit breaker shown in FIGS. 11-16 and the circuit breaker shown in FIGS. 3-8 are described below. Unless clearly contradictory or conflicting, the individual features of the embodiment of the circuit breaker shown in FIGS. 3-8 may be applied to the embodiment of the circuit breaker shown in FIGS. 11-16.

As shown in FIGS. 11-16, the circuit breaker 1 includes a severing mechanism 30 that is provided within the operating chamber 222 and is configured to perform a severing operation on the conductor 10. The severing mechanism 30 includes a punch 320 that is provided facing the conductor 10 and is capable of sliding in the longitudinal direction within the operating chamber 222. The severing mechanism 30 is configured to sever the conductor 10 extending through the housing 20 between the operating chamber 222 and the arc extinguishing chamber 242 by sliding the punch 320 in the longitudinal direction to act on the conductor 10.

A first severing section 120 and a second severing section 140 may be formed on the conductor 10. A severing point 130 is formed between the first severing section 120 and the second severing section 140, i.e., the first severing section 120 and the second severing section 140 are connected to each other by the severing point 130. The thickness of the severing point 130 can be smaller than the thickness of the first severing section 120 and the second severing section 140, allowing the conductor 10 to be broken at the severing point 130 when the first severing section 120 and the second severing section 140 are stressed. The thickness of the first severing section 120 and the second severing section 140 may be smaller than the thickness of the rest of the conductor 10 to allow for deformation of the first severing section 120 and the second severing section 140 when stressed.

The end of the punch 320 is aligned with the first severing section 120, the second severing section 140 and the severing point 130 in the longitudinal direction, and the center of the end of the punch 320 is aligned with the severing point 130. In the illustrated embodiment, the center portion of the end of the punch 320 is closer to the conductor 10 in the longitudinal direction than the edge portions on either side of the end of the punch 320, such that when the punch 320 performs a severing operation on the conductor 10 in the longitudinal direction, the center portion of the end of the punch 320 is firstly contacted with the conductor 10, specifically, contacted with the severing point 130 of the conductor 10, to facilitate breaking of the conductor 10 at the severing point 130.

The width of the punch 320 in the transverse direction may be substantially equal to or slightly less than the length of both the first severing section and the second severing section 140 in the transverse direction, such that the first severing section 120 and the second severing section 140 can be bent downwardly from extending in the transverse direction to extending substantially in the longitudinal direction and adjacent to opposite sides of the punch 320, respectively, and, at the same time, can be received in the first receiving portion 640 and the second receiving portion 642 of the supporting component 60, respectively. After being fully bent, the first severing section 120 is abutted against the side of the first receiving portion 640 and is sandwiched between the side of the first receiving portion 640 and one side of the punch 320, and the second severing section 140 is abutted against the side of the second receiving portion 642 and is sandwiched between the side of the second receiving portion 642 and the other side of the punch 320, as shown in FIGS. 13-16.

A receiving member 440 could be provided within the arc extinguishing chamber 242 of the circuit breaker 1. The receiving member 440 is aligned in the longitudinal direction with the punch 320 and the severing point 130 and is configured to receive the punch 320 after the conductor 10 is severed by the punch 320. After the punch 320 is received by the receiving member 440, the first arc extinguishing chamber **242*a* and the second arc extinguishing chamber 242*b* may be isolated from each other by the receiving member 440 and the punch 320**.

The receiving member 440 may be spaced apart from the severing point 130 of the conductor 10 in the longitudinal direction, i.e., a distance apart so as to facilitate breaking of the conductor 10 at the severing point 130, i.e., a distance such that the receiving member 440 does not interfere with or prevent the breaking of the conductor 10 at the severing point 130.

The receiving member 440 may be centered within the arc extinguishing chamber 242 and may be provided with a groove facing the punch 320 into which the punch 320 may be inserted after the conductor 10 has been severed by the punch 320. The receiving member 440 can be made of insulating material in order to play a role in isolating the arc conduction.

The depth of the groove of the receiving member 440 in the longitudinal direction may be designed in relation to the size of the punch 320 in the longitudinal direction such that, upon termination of the downward movement of the punch 320 in the longitudinal direction, the punch 320 can be fully or partially extended into or inserted into the groove of the receiving member 440, for example, the end of the punch 320 can be abutted against or near the bottom of the groove of the receiving member 440. In the case where the end of the punch 320 is abutted against the bottom of the groove of the receiving member 440, the receiving member 440 may also act as a stop to stop further downward movement of the punch 320 in the longitudinal direction.

At the severing completion of the circuit breaker 1, i.e., when the punch 320 moves downward in the longitudinal direction until the punch 320 is inserted into the groove of the receiving member 440, a creepage path is defined between the severing end of the first severing section 120 of the conductor 10 (the end at the severing point 130 before the severing) and the severing end of the second severing section 140 (the end at the severing point 130 before the severing), which the creepage path is extended from the severing end of the first severing section 120, through the end of the punch 320, to the severing end of the second severing section 140.

Figure 17:
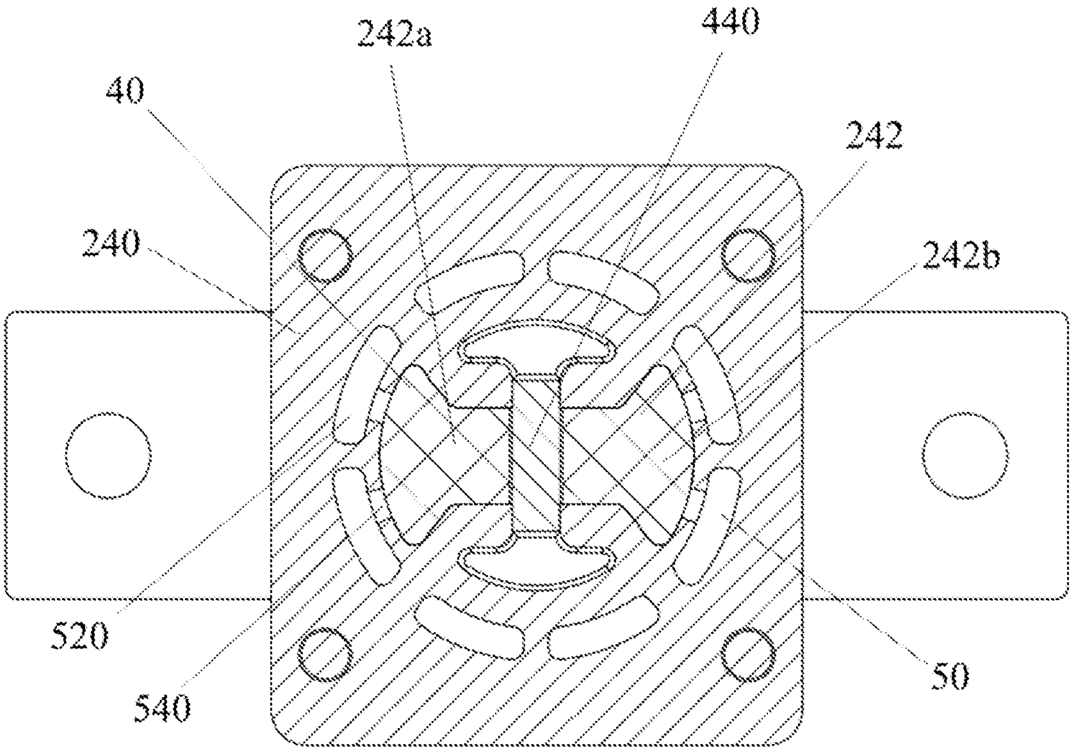
FIG. 17 is a top cross-sectional view of a circuit breaker according to another embodiment of the present application, showing the arc extinguishing chamber and the arc extinguishing medium and gas flow guiding mechanism therein.

In this embodiment, there are eight cavities 520 evenly distributed around the first arc extinguishing chamber **242*a* and the second arc extinguishing chamber 242*b*, as shown in FIG. 17. Four of the eight cavities 520 are connected to the arc extinguishing chamber 242 via inlets 540, in which two of the cavities 520 are in communication with the first arc extinguishing chamber 242*a* via inlets 540 and the other two cavities 520 are in communication with the second arc extinguishing chamber 242***b* via inlets 540. It should be understood by those skilled in the art that all eight cavities 520 may also be in communication with the arc extinguishing chamber 242 through the inlets 540, for example, four cavities 520 are in communication with the first arc extinguishing chamber 242*a* and the other four cavities 520 are in communication with the second arc extinguishing chamber 242*b*. It will be understood by those skilled in the art that the arrangement of the cavity 520 in the embodiment shown in FIG. 17 can also be applied to the embodiment of FIGS. 3-8.

Figure 11:
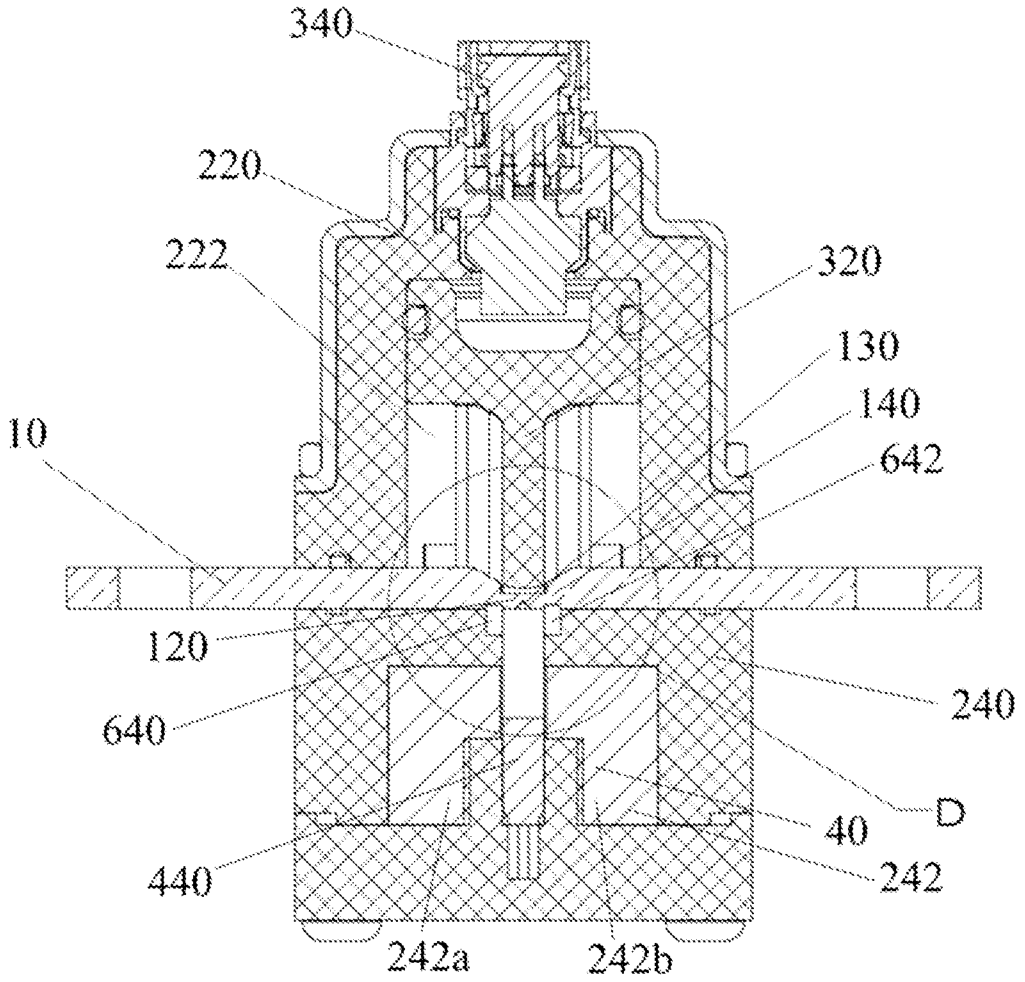
FIG. 11 is a cross-sectional view of a circuit breaker according to another embodiment of the present application, showing the circuit breaker in a normal operating state.
Figure 12:
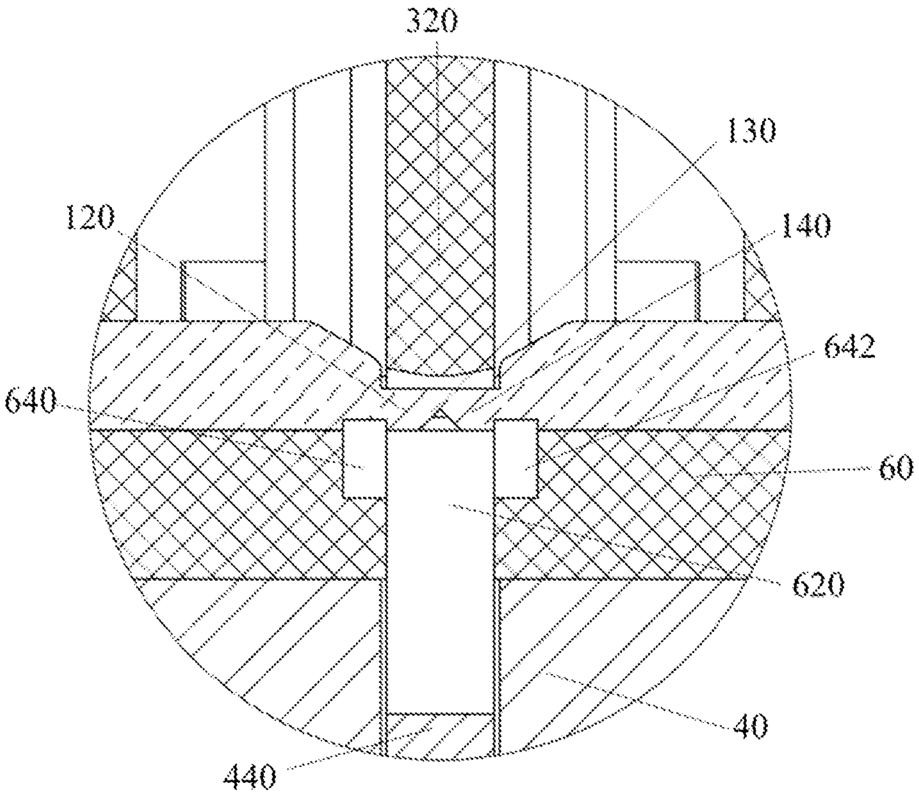
FIG. 12 is an enlarged view of part D of FIG. 11.

As shown in FIGS. 11-12, in the normal operating condition, there is no abnormal condition such as overload, break or short circuit in the main circuit, the circuit breaker 1 does not perform breaking operation in the main circuit, and the severing mechanism 30 is above the conductor 10 without acting on the conductor 10.

Figure 13:
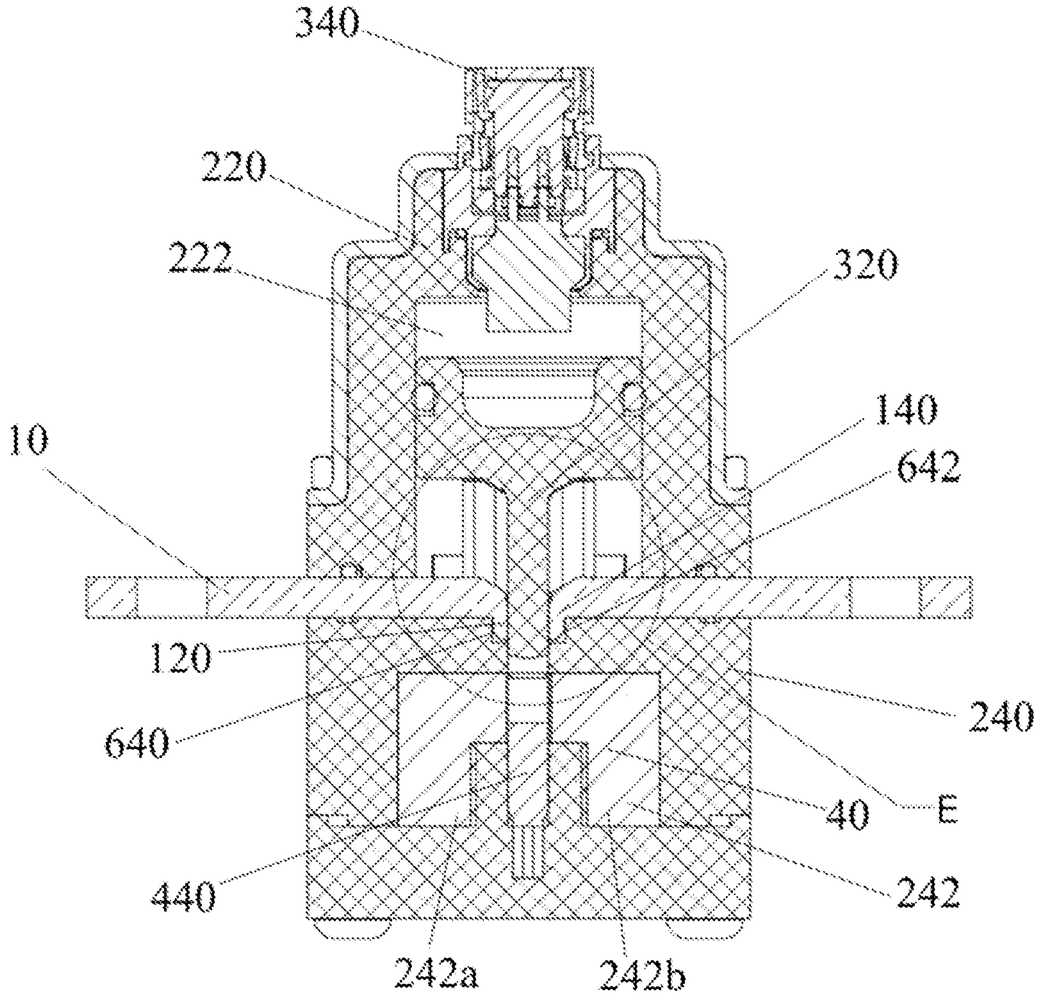
FIG. 13 is a cross-sectional view of a circuit breaker according to another embodiment of the present application, showing the circuit breaker in a severing operating state.
Figure 14:
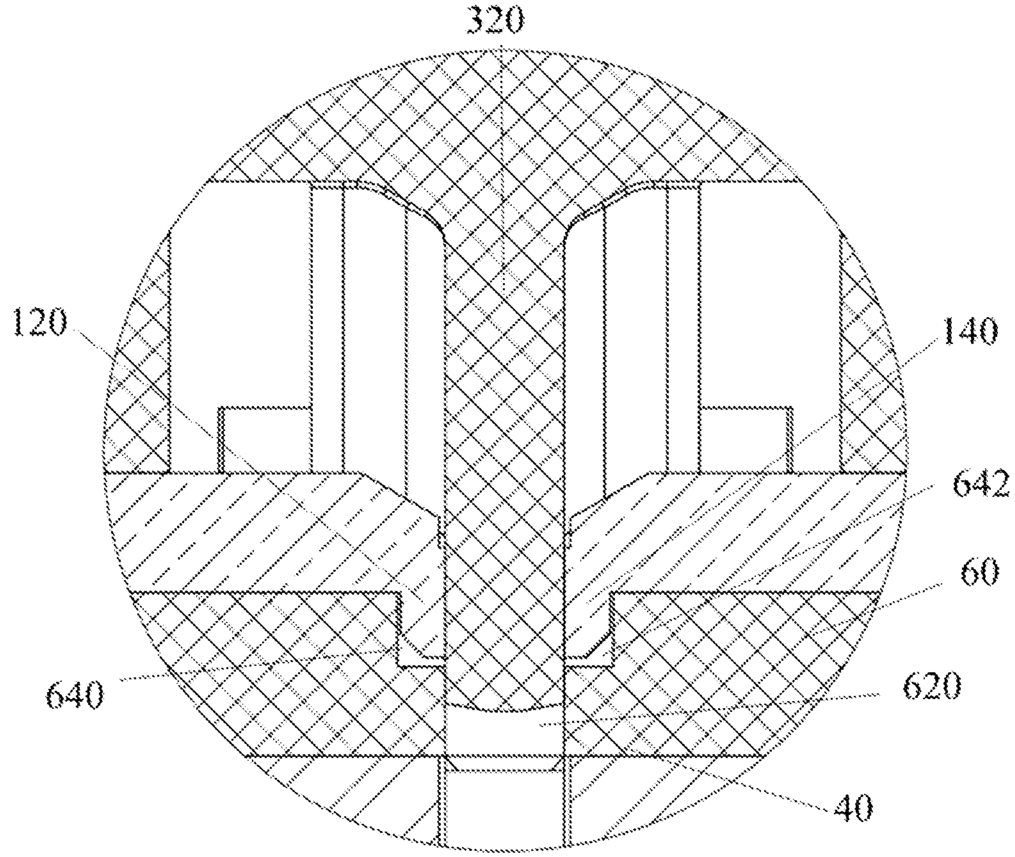
FIG. 14 is an enlarged view of part E of FIG. 13.

As shown in FIG. 13-14, when there is an abnormal condition such as overload or short circuit in the main circuit, the circuit breaker 1 is switched from the normal operating state to the severing operating state. Specifically, an actuation signal is received by the actuator 340 and then the actuator 340 is activated to move the punch 320 in the longitudinal direction toward the conductor 10 such that the punch 320 firstly abuts against and acts on the severing point 130 and then on the first severing section 120 and the second severing section 140, causing the conductor 10 to be broken at the severing point 130 between the first severing section 120 and the second severing section 140. The first severing section 120 is bent downwardly around the end of the first severing section 120 opposite the severing point 130, and the second severing section 140 is bent downwardly around the end of the second severing section 140 opposite the severing point 130. At this point, the punch 320 continues to move in the longitudinal direction toward the receiving member 440 and can be contacted with the arc extinguishing medium within the arc extinguishing chamber 242. During this time, the gas pressure around the punch 320 increases, thereby pushing the nearby gas along the gas flow guiding path through the arc extinguishing medium 40 and into the cavity 520 of the gas flow guiding mechanism 50 due to the gas flow guiding mechanism 50.

Figure 15:
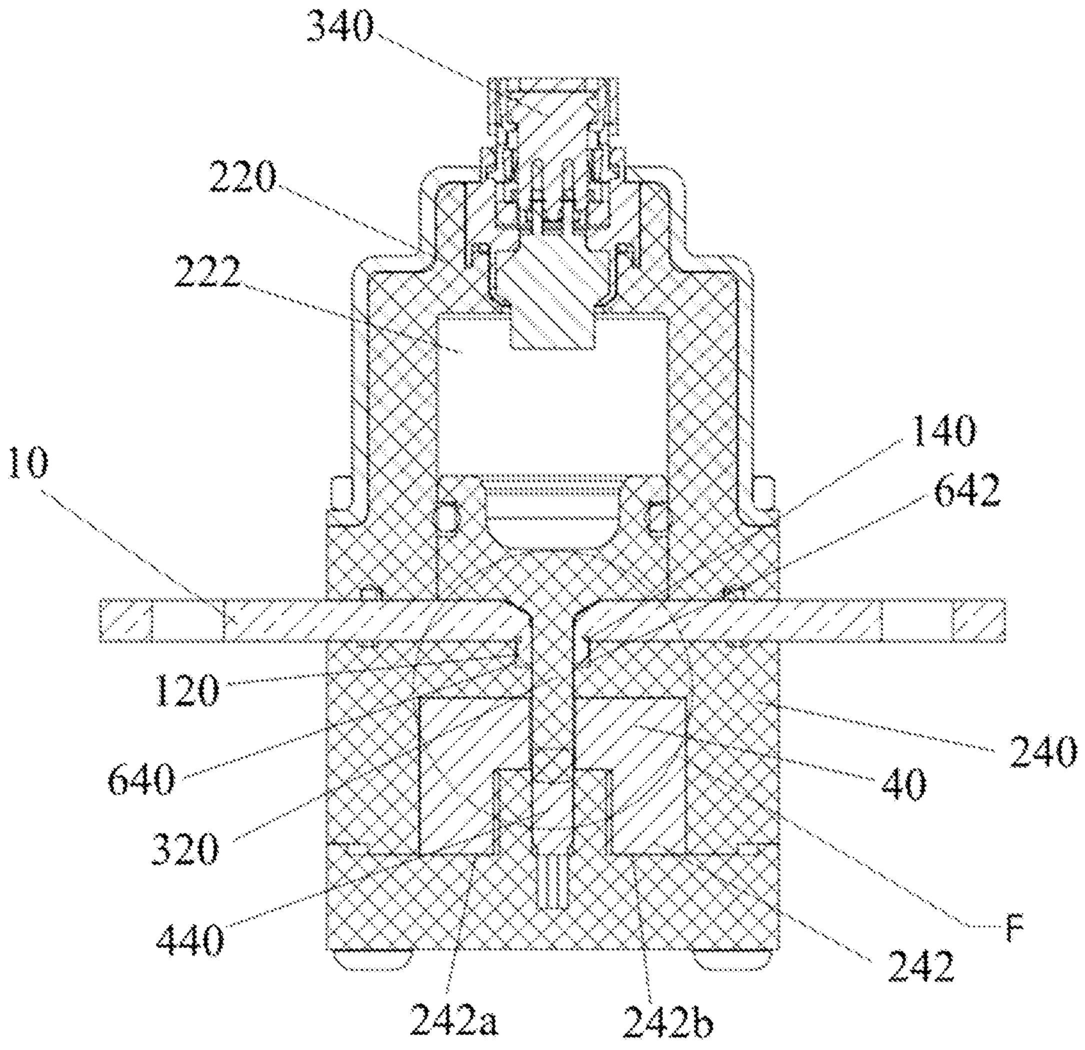
FIG. 15 is a cross-sectional view of a circuit breaker according to another embodiment of the present application, showing the circuit breaker in the severing completion state.
Figure 16:
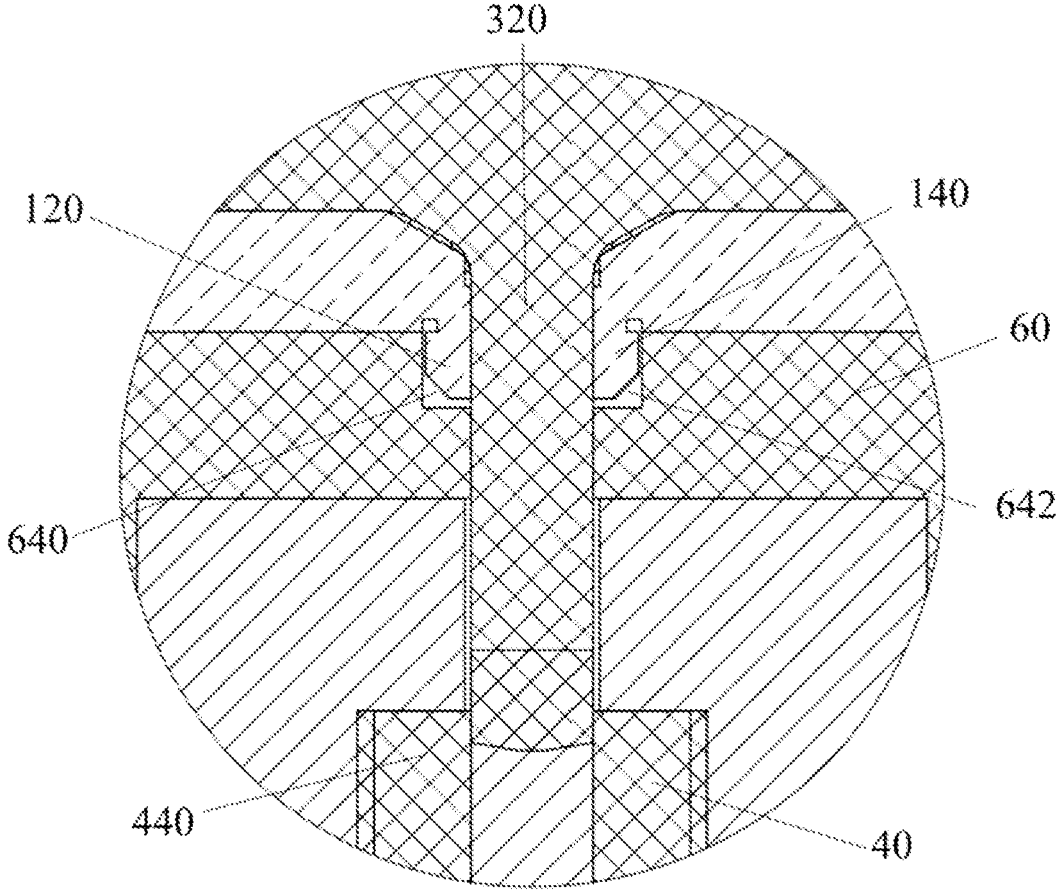
FIG. 16 is an enlarged view of part F of FIG. 15.

As shown in FIGS. 15-16, as the punch 320 continues to move in the longitudinal direction, the punch 320 is finally fully inserted into the groove of the receiving member 440, and the circuit breaker 1 is switched from the severing operating state to the severing completion state. At this point, the conductor 10 is broken and the arc generated is dissipated, thereby the main circuit is completely disconnected.

Another embodiment according to the present application is described below with reference to FIGS. 18-24. FIGS. 18-24 show sectional views and enlarged views of the circuit breaker 1 according to the present application in the normal operating state, the severing operating state and the severing completion state, respectively. The embodiment of the circuit breaker shown in FIGS. 18-24 is substantially similar to the embodiment of the circuit breaker shown in FIGS. 3-8 and 11-17, and only the differences between the circuit breaker shown in FIGS. 18-24 and the circuit breaker shown in FIGS. 3-8 and 11-17 are described below: Unless clearly contradictory or in conflict, the individual features of the embodiments of the circuit breakers shown in FIGS. 3-8 and 11-17 may be applied to the embodiments of the circuit breakers shown in FIGS. 18-24.

As shown in FIGS. 18-23, the circuit breaker 1 includes a severing mechanism 30 that is provided within the operating chamber 222 and is configured to perform a severing operation on the conductor 10. The severing mechanism 30 includes a punch 320 that is provided facing the conductor 10 and is capable of sliding in the longitudinal direction within the operating chamber 222. The severing mechanism 30 is configured to sever the conductor 10 extending through the housing 20 between the operating chamber 222 and the arc extinguishing chamber 242 by sliding the punch 320 in the longitudinal direction to act on the conductor 10.

The conductor 10 is formed with a severing section 110 and a severing point 130 connected to each other. The thickness of the severing point 130 can be smaller than the thickness of the severing section 110, allowing the conductor 10 to be broken at the severing point 130 when the severing section 110 is stressed. The end of the punch 320 is aligned with the severing section 110 in the longitudinal direction. The thickness of the severing section 110 may be smaller than the thickness of the rest of the conductor 10 to allow for deformation of the severing section 110 when stressed.

The width of the punch 320 in the transverse direction may be substantially equal to or slightly less than the length of the severing section 110 in the transverse direction, such that the severing section 110 can be bent downwardly from extending in the transverse direction to extending substantially in the longitudinal direction and adjacent to the side of the punch 320. In this embodiment, the supporting component 60 may include a receiving portion 644, as shown in FIGS. 18-23, and the bent severing portion 110 may be received in the receiving portion 644 of the supporting component 60. After being fully bent, the severing portion 110 is abutted against the side of the receiving portion 644 and is sandwiched between the side of the receiving portion 644 and the side of the punch 320, as shown in FIGS. 20-23.

A receiving member 440 could be provided within the arc extinguishing chamber 242 of the circuit breaker 1. The receiving member 440 is aligned in the longitudinal direction with the punch 320 and the severing section 110 and is configured to receive the punch 320 after the conductor 10 is severed by the punch 320. After the punch 320 is received by the receiving member 440, the first arc extinguishing chamber 242*a* and the second arc extinguishing chamber 242*b* may be isolated from each other by the receiving member 440 and the punch 320.

The receiving member 440 may be spaced apart from the severing section 110 of the conductor 10 in the longitudinal direction, i.e., a distance apart so as to facilitate breaking of the conductor 10 at the severing point 130, i.e., a distance such that the receiving member 440 does not interfere with or prevent the breaking of the conductor 10 at the severing point 130.

Figure 20:
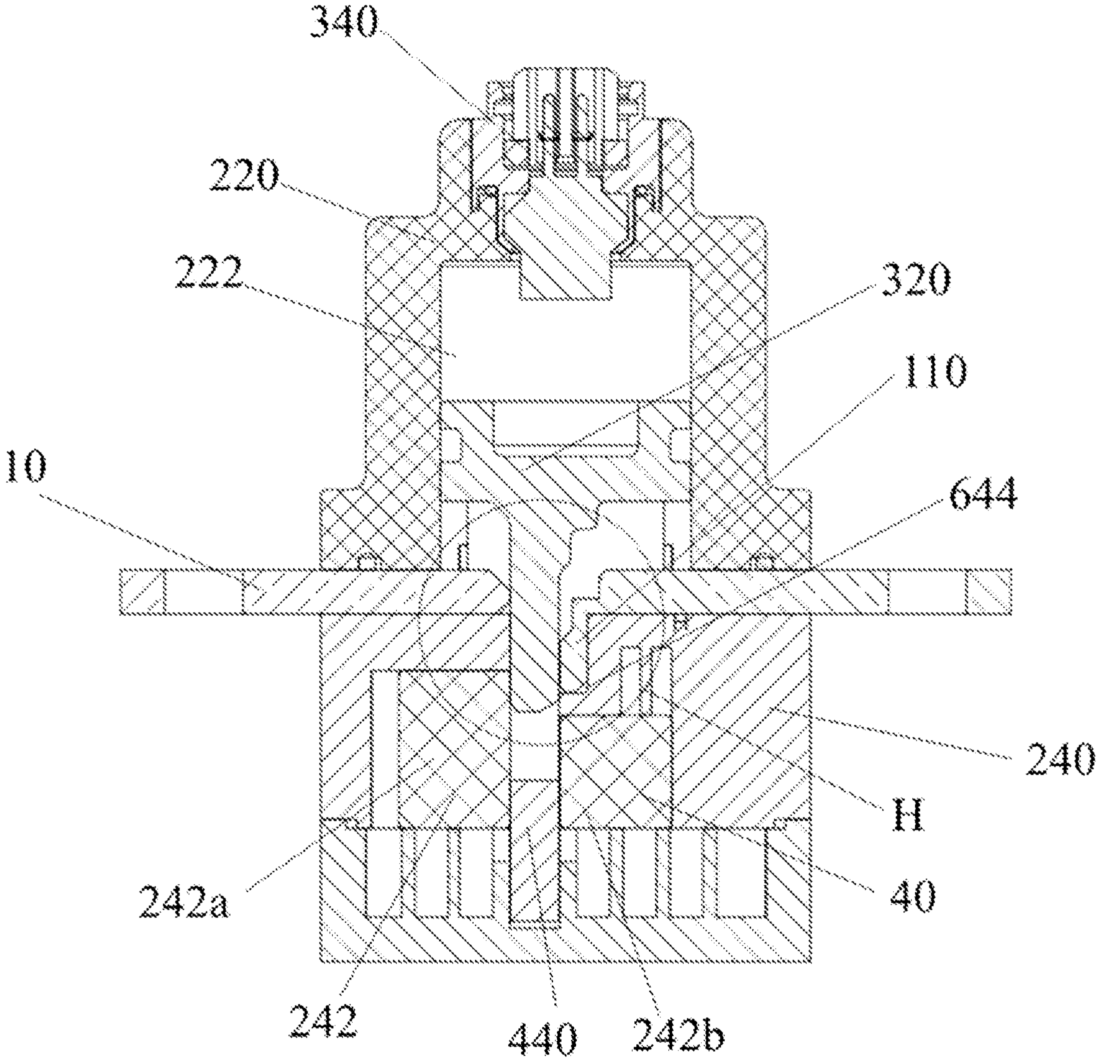
FIG. 20 is a cross-sectional view of a circuit breaker according to yet another embodiment of the present application, showing the circuit breaker in a severing operating state.
Figure 21:
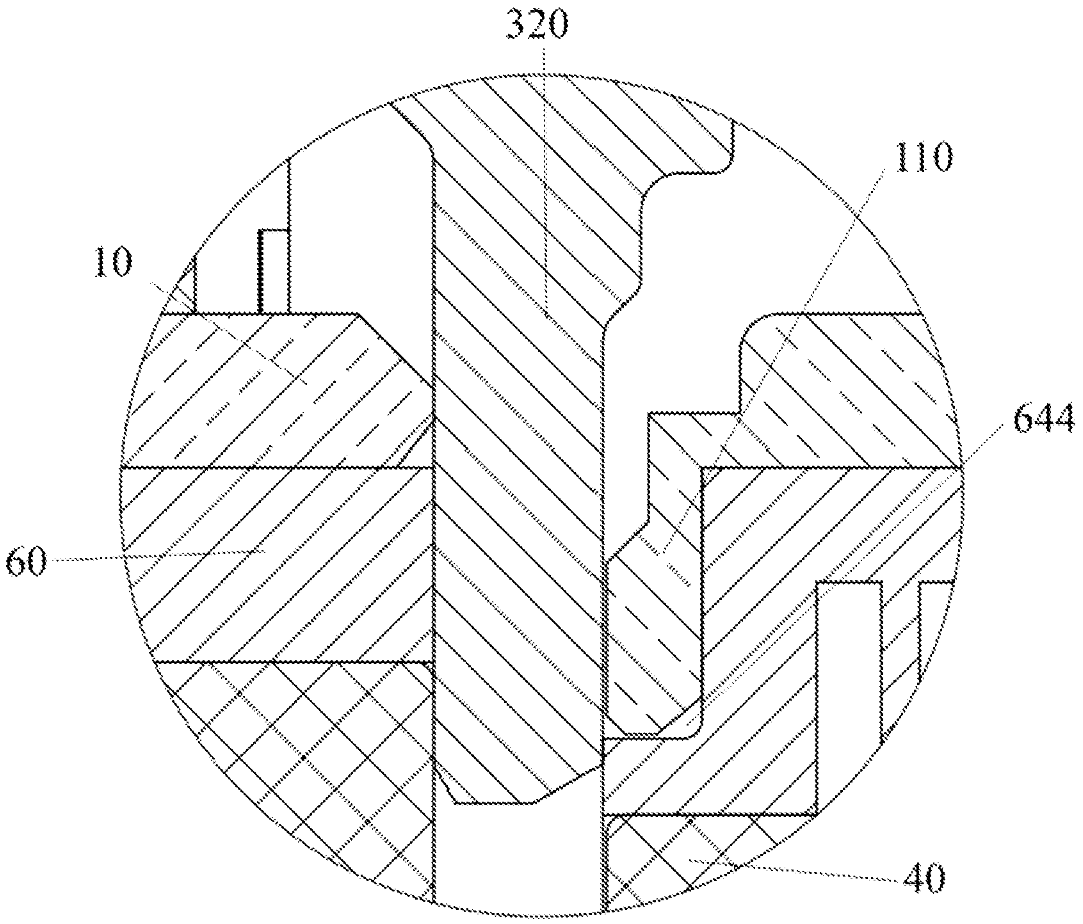
FIG. 21 is an enlarged view of part H of FIG. 20.
Figure 22:
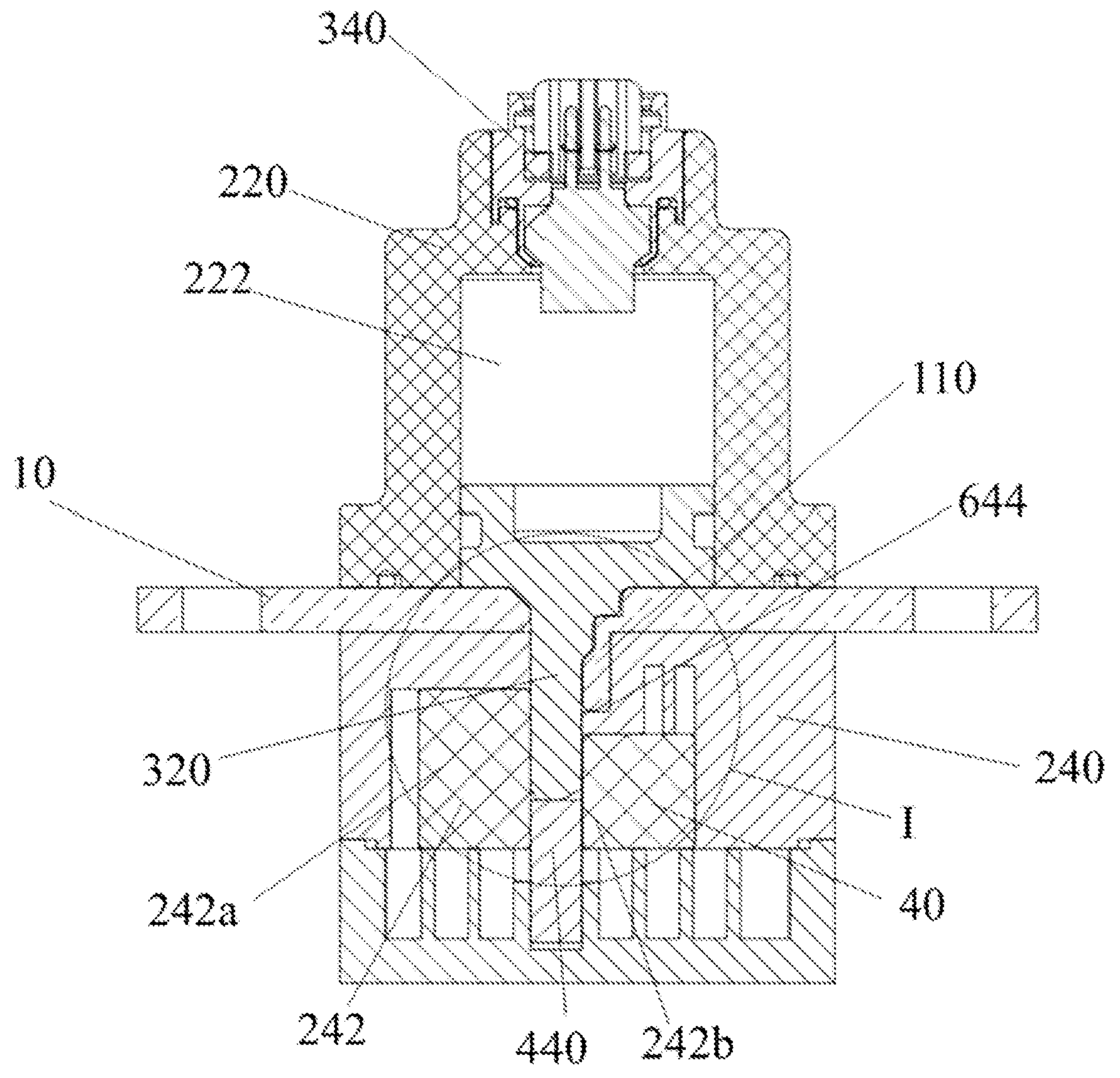
FIG. 22 is a cross-sectional view of a circuit breaker according to yet another embodiment of the present application, showing the circuit breaker in the severing completion state.
Figure 23:
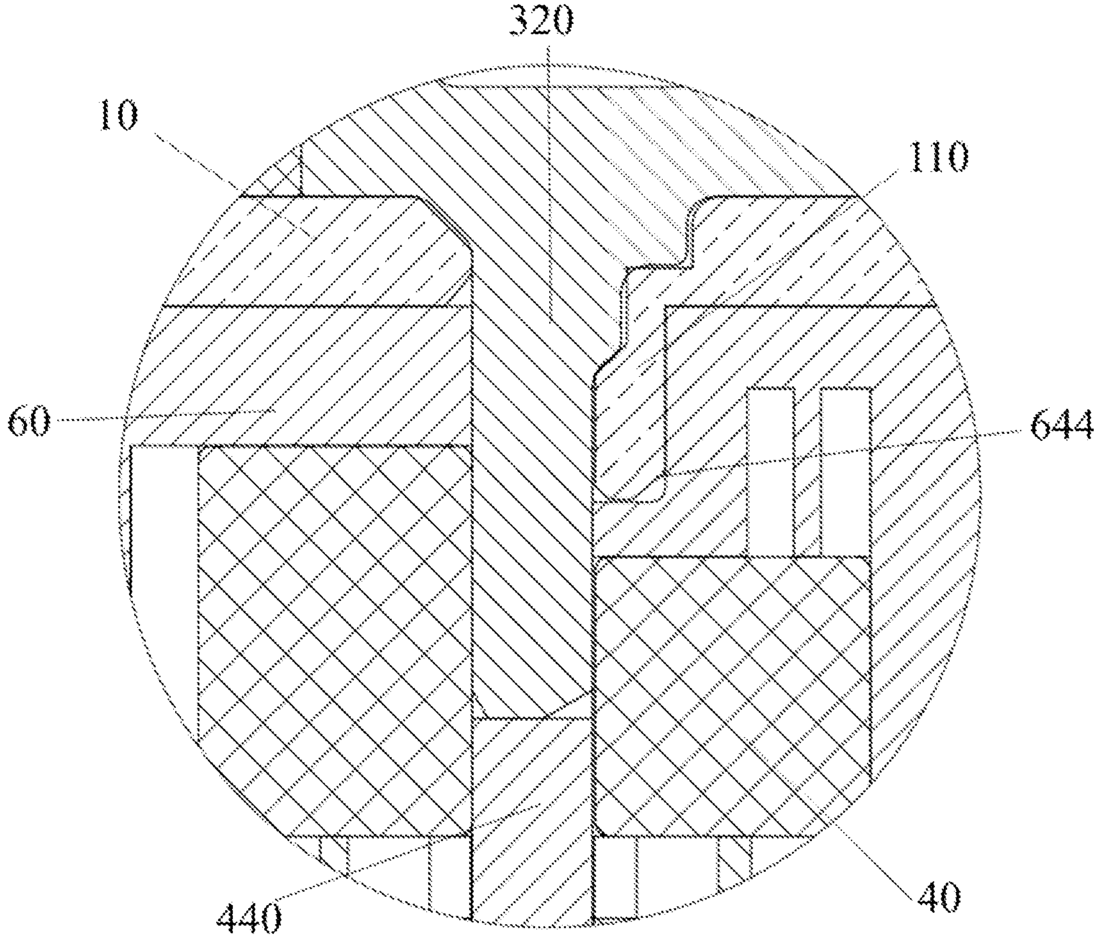
FIG. 23 is an enlarged view of portion I of FIG. 22.

The receiving member 440 may be eccentrically disposed within the arc extinguishing chamber 242, as shown in FIGS. 18-23. Accordingly, the punch 320 may be eccentrically disposed in the operating chamber 222. After the conductor 10 is severed by the punch 320, the punch 320 may abut against the receiving member 440, as shown in FIGS. 22-23. The receiving member 440 can be made of insulating material in order to play a role in isolating the arc conduction.

The size of the receiving member 440 in the longitudinal direction may be designed in association with the size of the punch 320 in the longitudinal direction such that the punch 320 can be abutted against the receiving member 440 when the downward movement of the punch 320 in the longitudinal direction terminates. For example, the end of the punch 320 may be abutted against or impacted on the top of the receiving member 440. In the case where the end of the punch 320 is abutted against the receiving member 440, the receiving member 440 may also act as a stop to stop further downward movement of the punch 320 in the longitudinal direction.

At the severing completion of the circuit breaker 1, i.e., when the punch 320 moves downward in the longitudinal direction until the punch 320 is completely abutted against the receiving member 440, a creepage path is defined between the severing end of the severing section 110 of the conductor 10 (the end at the severing point 130 before the severing) and the severing point 130. The creepage path is extended from the severing end of the disconnection section 110, through the end of the punch 320, to the severing point 130.

Figure 24:
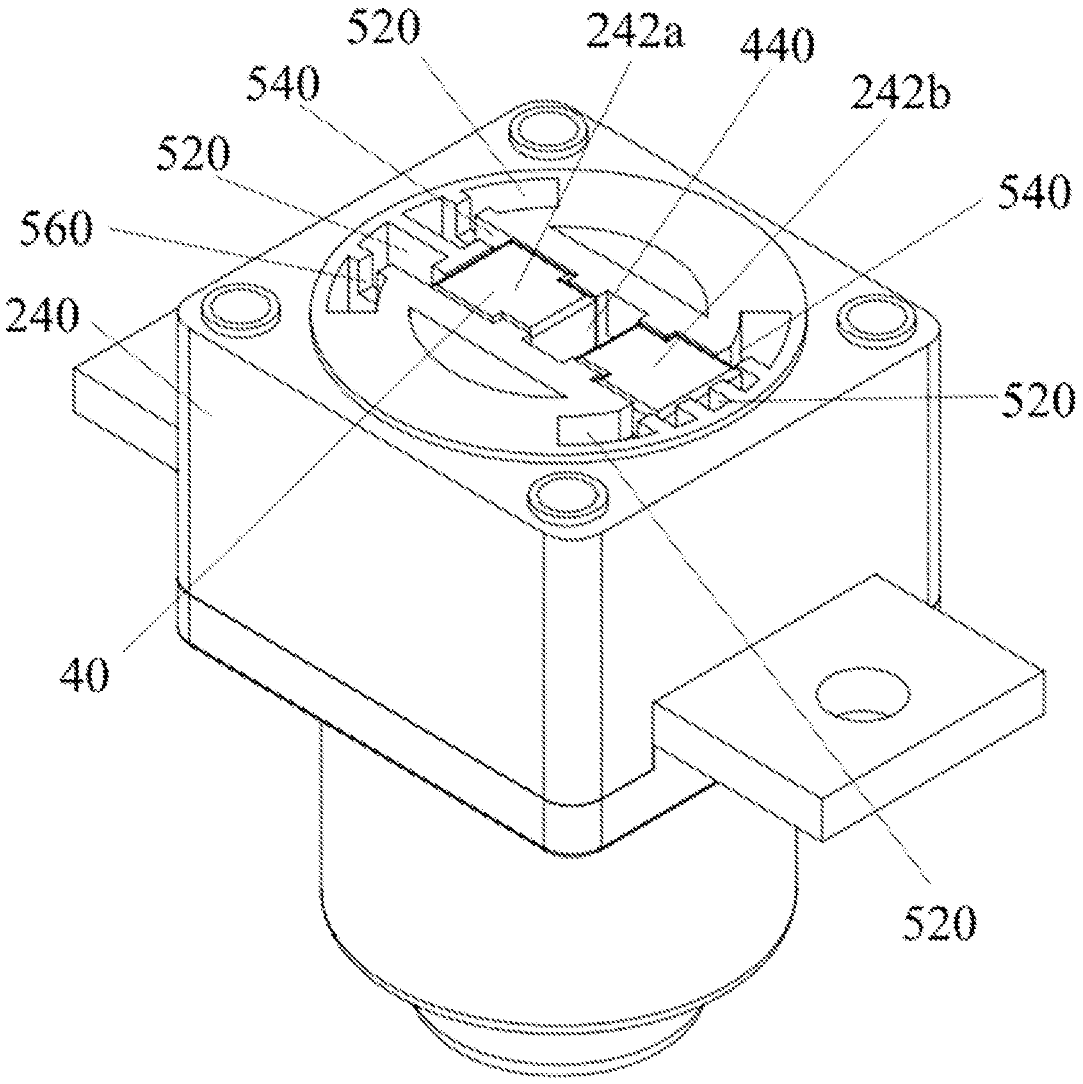
FIG. 24 is a perspective cross-sectional view of a circuit breaker according to yet another embodiment of the present application, showing the arc extinguishing chamber and the arc extinguishing medium and gas flow guiding mechanism therein.

In this embodiment, there are nine cavities 520 distributed around the first arc extinguishing chamber 242*a* and the second arc extinguishing chamber 242*b*, as shown in FIG. 24. The nine cavities 520 are not uniform in size with each other, nor are they arranged uniformly or symmetrically around the arc extinguishing chamber 242.

The cavities 520 and the arc extinguishing chamber 242 can be in communication with each other in a plurality of manners. In the embodiment shown in FIG. 24, two of the cavities 520 are in communication with the first arc extinguishing chamber 242*a* through the inlets 540 and are in communication with the cavities 520 on each side thereof through the communication ports 560, such that the cavities 520 on each side are indirectly in communication with the first arc extinguishing chamber 242*a*. Three of the cavities 520 may be directly in communication with the second arc extinguishing chamber 242*b*, with two cavities 520 on either side of the three cavities 520 being in communication with the second arc extinguishing chamber 242*b* via inlets 540. It will be understood by those skilled in the art that the arrangement of cavities 520 in the embodiment shown in FIG. 24 can also be applied to the embodiments of FIGS. 3-8 as well as FIGS. 11-16.

Figure 18:
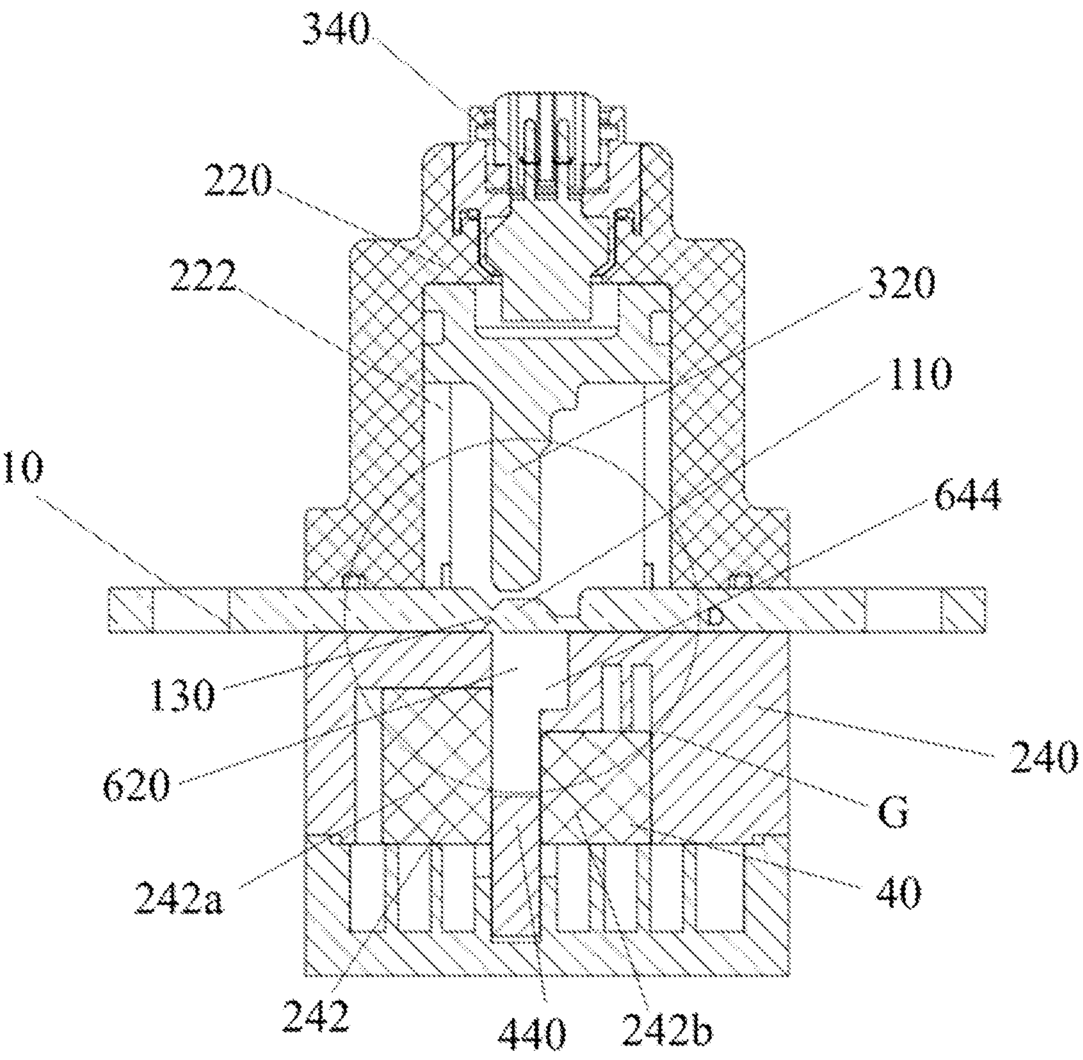
FIG. 18 is a cross-sectional view of a circuit breaker according to yet another embodiment of the present application, showing the circuit breaker in a normal operating state.
Figure 19:
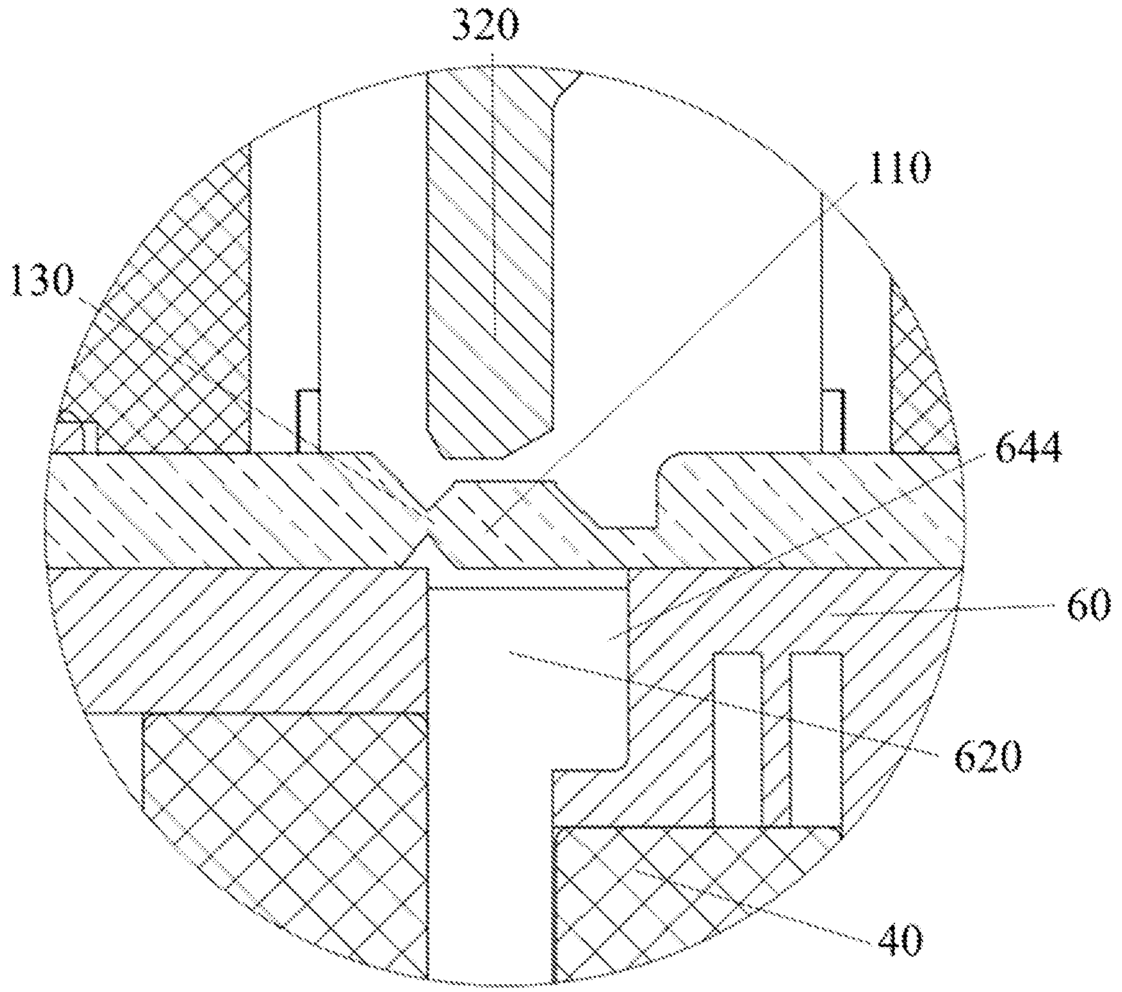
FIG. 19 is an enlarged view of part G of FIG. 18.

As shown in FIGS. 18-19, in the normal operating condition, there is no abnormal condition such as overload, break or short circuit in the main circuit, the circuit breaker 1 does not perform breaking operation in the main circuit, and the severing mechanism 30 is above the conductor 10 without acting on the conductor 10.

As shown in FIG. 20-21, when there is an abnormal condition such as overload or short circuit in the main circuit, the circuit breaker 1 is switched from the normal operating state to the severing operating state. Specifically, an actuation signal is received by the actuator 340 and then the actuator 340 is activated to move the punch 320 in the longitudinal direction toward the conductor 10 such that the punch 320 is abutted against and acted on the severing section 110, causing the conductor 10 to be broken at the severing point 130 and the severing section 110 to be bent downwardly around the end of the severing section 110 opposite the severing point 130. At this point, the punch 320 continues to move in the longitudinal direction toward the receiving member 440 and can be contacted with the arc extinguishing medium within the arc extinguishing chamber 242. During this time, the gas pressure around the punch 320 increases, thereby pushing the nearby gas along the gas flow guiding path through the arc extinguishing medium 40 and into the cavity 520 of the gas flow guiding mechanism 50 due to the gas flow guiding mechanism 50.

As shown in FIGS. 22-23, as the punch 320 continues to move in the longitudinal direction, the punch 320 is eventually fully abutted against the receiving member 440 and the circuit breaker 1 is switched from the severing operating state to the severing completion state. At this point, the conductor 10 is broken and the arc generated is dissipated, thereby the main circuit is completely disconnected.

Example 1

The inventors simulated the situation that the electric vehicle battery module breaks during operation and tested the circuit breaker 1 according to the present application, and the test results showed that the circuit breaker 1 according to the present application can quickly disconnect the main circuit, and the insulation resistance performance is good after disconnecting the main circuit.

Test principle: The circuit is composed of battery, resistor, switch and circuit breaker 1. When the switch is closed, the circuit instantly generates a high current and circuit breaker 1 is triggered to disconnect the circuit to achieve the protection effect.

Test conditions: The test voltage is 1000V, the test current is 13 KA, and the test loop inductance is 15.4 uH.

Test results: Insulation impedance >10 GΩ after the test.

Figure 25:
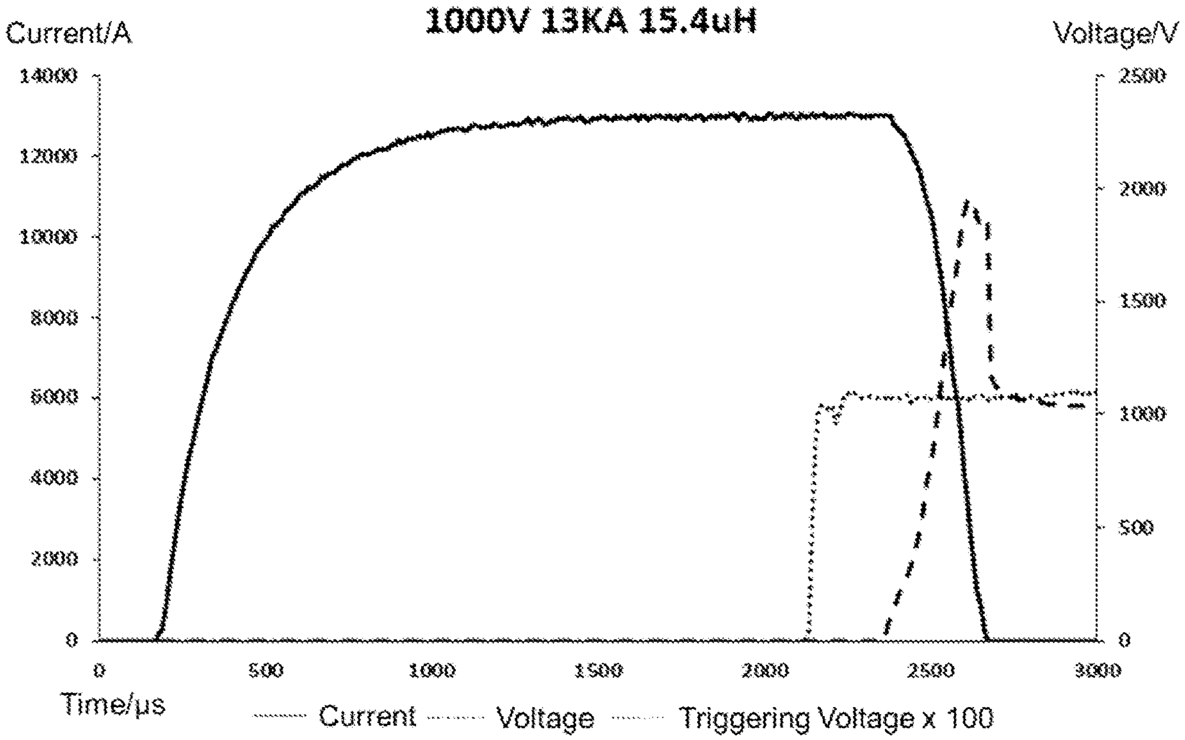
FIG. 25 is a graph of test results for a circuit breaker according to some embodiments of the present application.

FIG. 25 illustrates a graph of test results for a circuit breaker according to some embodiments of the present application. As can be seen from the figure, when a short circuit occurs in the (1000V system) circuit, the current instantly increases to 13 KA. When the trigger signal is received, the circuit breaker 1 starts to disconnect the circuit. Due to the good arc extinguishing effect of the circuit breaker 1, the circuit overvoltage instantly climbs to 2000V, the current quickly decays to OA, and finally the arc is extinguished, and the circuit voltage stabilizes at the system voltage.

After the same test of the circuit breakers commonly available in the market, the test results are basically that the insulation impedance can exceed 10 MΩ, but far from reaching the insulation impedance of more than 10 GΩ of the circuit breaker 1 according to the present application. As can be seen, the breaking effect obtained with the circuit breaker 1 according to the present application is remarkable, compared to some existing circuit breakers, and can be said as a surprised technical effect, exceeding the existing products by several orders of magnitude.

Although exemplary embodiments of the present application have been described, those skilled in the art should readily appreciate that many variations and modifications are possible in the exemplary embodiments without materially departing from the novel teachings and advantages of the present application. Accordingly, all such variations and modifications are intended to be included within the scope of the present application as defined in the claims. The present application is defined by the following claims, with equivalents of the claims to be included therein.

The invention claimed is:

1. A circuit breaker comprising:

a housing defining an operating chamber and an arc extinguishing chamber; and a severing mechanism provided in the operating chamber and comprising a punch, the severing mechanism being configured to sever via the punch a conductor extending through the housing between the operating chamber and the arc extinguishing chamber;

wherein the punch of the severing mechanism comprises a first punch and a second punch spaced apart from each other to define a groove therebetween, wherein the conductor is broken at a single severing point when the conductor extending through the housing is severed by the severing mechanism;

wherein a baffle plate is provided within the arc extinguishing chamber, the baffle plate being aligned with the groove, and the baffle plate being configured to be inserted into the groove after the conductor is broken at the severing point, the baffle plate being inserted into a groove of the housing such that the baffle plate and the groove cooperate to define a tortuous creepage path that electrically isolates severed conductor sections and physically divides the arc extinguishing chamber into a first arc extinguishing chamber and a second arc extinguishing chamber; and wherein the circuit breaker further comprises:

an arc extinguishing medium filled within the arc extinguishing chamber; and a gas flow guiding mechanism disposed around the arc extinguishing medium and configured to guide gas from the punch of the severing mechanism through the arc extinguishing medium when the conductor extending through the housing is severed by the severing mechanism, the gas flow guiding mechanism comprising a plurality of gas guiding cavities circumferentially surrounding the arc extinguishing medium to promote uniform gas diffusion around the medium.

2. The circuit breaker according to claim 1, wherein a gas flow guiding path is defined from the punch of the severing mechanism to the gas flow guiding mechanism, and the arc extinguishing medium is located in the gas flow guiding path.

3. The circuit breaker according to claim 1, wherein the gas flow guiding mechanism comprises a plurality of cavities surrounding the arc extinguishing medium, wherein the gas flows from the punch of the severing mechanism through the arc extinguishing medium and into the plurality of cavities when the conductor extending through the housing is severed by the severing mechanism.

4. The circuit breaker according to claim 3, wherein a cavity of the plurality of cavities has an inlet facing the arc extinguishing medium, wherein the gas flows from the punch of the severing mechanism through the arc extinguishing medium and into the cavity via the inlet when the conductor extending through the housing is severed by the severing mechanism.

5. The circuit breaker according to claim 1, wherein when the conductor extending through the housing is severed by the severing mechanism, the first punch is acted on a first severing section of the conductor to bend the first severing section downward and the second punch is acted on a second severing section of the conductor to bend the second severing section downward, so that the conductor is broken at the single severing point between the first severing section and the second severing section.

6. The circuit breaker according to claim 5, wherein a creepage path is defined from a severing end of the first severing section, through an end of the first punch, through a bottom of the groove and a top of the baffle plate, through an end of the second punch, to a severing end of the second severing section.

7. The circuit breaker according to claim 1, wherein the groove is aligned with the severing point.

8. The circuit breaker according to claim 1, wherein the first punch and the second punch are extended into the arc extinguishing chamber and contacted with the arc extinguishing medium in the arc extinguishing chamber respectively, after the conductor is broken at the severing point.

9. The circuit breaker according to claim 1, wherein the baffle plate is spaced at a distance from the severing point so as to facilitate the conductor being broken at the severing point.

10. The circuit breaker according to claim 1, wherein the arc extinguishing chamber is divided by the baffle plate into a first arc extinguishing chamber and a second arc extinguishing chamber isolated from each other, the first arc extinguishing chamber and the second arc extinguishing chamber being filled with the arc extinguishing medium.

11. The circuit breaker according to claim 10, wherein the first punch is extended into the first arc extinguishing chamber and contacted with the arc extinguishing medium in the first arc extinguishing chamber, and the second punch is extended into the second arc extinguishing chamber and contacted with the arc extinguishing medium in the second arc extinguishing chamber, after the conductor is broken at the severing point.

12. The circuit breaker according to claim 1, wherein the arc extinguishing chamber is covered with a supporting component for supporting the conductor, wherein an opening is formed at a portion of the supporting component corresponding to a first severing section and a second severing section of the conductor, such that the first severing section and the second severing section are bent downward through the opening and the first punch and the second punch are extended through the opening into the arc extinguishing chamber, when the conductor extending through the housing is severed by the severing mechanism.

13. The circuit breaker according to claim 12, wherein the opening is configured such that the first severing section and second severing section of the conductor are not supported by the supporting component.

14. The circuit breaker according to claim 12, wherein a first receiving portion and a second receiving portion are formed at the opening of the supporting component, wherein the first receiving portion and the second receiving portion are configured to receive the first severing section bent downward and the second severing section bent downward respectively after the conductor is broken at the severing point.

15. A circuit breaker comprising:

a housing defining an operating chamber and an arc extinguishing chamber; and a severing mechanism provided in the operating chamber and comprising a punch, the severing mechanism being configured to sever via the punch a conductor extending through the housing between the operating chamber and the arc extinguishing chamber;

wherein the conductor is broken at a single severing point when the conductor extending through the housing is severed by the punch of the severing mechanism;

wherein a receiving member is provided within the arc extinguishing chamber, the receiving member being aligned with the punch, the receiving member and the housing cooperating to define a first arc extinguishing chamber and a second arc extinguishing chamber isolated from each other, each of the first and second arc extinguishing chambers being filled with an arc extinguishing medium, the punch is accepted by the receiving member after the conductor is broken at the severing point; and wherein the circuit breaker further comprises:

an arc extinguishing medium filled within the arc extinguishing chamber; and a gas flow guiding mechanism disposed around the arc extinguishing medium and configured to guide gas from the punch of the severing mechanism through the arc extinguishing medium when the conductor extending through the housing is severed by the severing mechanism, wherein the gas flow guiding mechanism comprises a plurality of gas guiding cavities circumferentially surrounding the arc extinguishing medium.

16. The circuit breaker according to claim 15, wherein a gas flow guiding path is defined from the punch of the severing mechanism to the gas flow guiding mechanism, and the arc extinguishing medium is located in the gas flow guiding path.

17. The circuit breaker according to claim 15, wherein the gas flow guiding mechanism comprises a plurality of cavities surrounding the arc extinguishing medium, wherein the gas flows from the punch of the severing mechanism through the arc extinguishing medium and into the plurality of cavities when the conductor extending through the housing is severed by the severing mechanism.

18. The circuit breaker according to claim 17, wherein a cavity of the plurality of cavities has an inlet facing the arc extinguishing medium, wherein the gas flows from the punch of the severing mechanism through the arc extinguishing medium and into the cavity via the inlet when the conductor extending through the housing is severed by the severing mechanism.

19. The circuit breaker according to claim 15, wherein when the conductor extending through the housing is severed by the severing mechanism, the punch is acted on a severing section of the conductor to bend the severing section downward, so that the conductor is broken at a single severing point.

20. The circuit breaker according to claim 15, wherein the receiving member is aligned with the severing point or severing section of the conductor.

* * * * *